United States Patent
Aoyama

(10) Patent No.: US 10,948,606 B2
(45) Date of Patent: Mar. 16, 2021

(54) RECORDING MEDIUM ON WHICH INDOOR/OUTDOOR DETERMINATION PROGRAM IS RECORDED, INDOOR/OUTDOOR DETERMINATION SYSTEM, INDOOR/OUTDOOR DETERMINATION METHOD, MOBILE TERMINAL, AND MEANS FOR CLASSIFYING AND DETERMINING INDOOR/OUTDOOR ENVIRONMENT

(71) Applicant: NEC Corporation, Tokyo (JP)

(72) Inventor: Akio Aoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 241 days.

(21) Appl. No.: 16/086,043

(22) PCT Filed: Mar. 22, 2017

(86) PCT No.: PCT/JP2017/011313
§ 371 (c)(1),
(2) Date: Sep. 18, 2018

(87) PCT Pub. No.: WO2017/170005
PCT Pub. Date: Oct. 5, 2017

(65) Prior Publication Data
US 2020/0292716 A1    Sep. 17, 2020

(30) Foreign Application Priority Data

Mar. 30, 2016   (JP) .............................. JP2016-069713

(51) Int. Cl.
*H04W 4/33* (2018.01)
*G01S 19/45* (2010.01)
(Continued)

(52) U.S. Cl.
CPC .............. *G01S 19/45* (2013.01); *G01S 19/13* (2013.01); *G01S 19/425* (2013.01); *G06F 16/29* (2019.01); *H04W 4/33* (2018.02)

(58) Field of Classification Search
CPC .......... G01S 19/28; G01S 19/42; G01S 19/45; G01S 19/13; G01S 16/29; G01S 19/425;
(Continued)

(56) References Cited

U.S. PATENT DOCUMENTS 6,236,354 B1    5/2001   Krasner
6,313,786 B1 *  11/2001  Sheynblat ............ G01C 21/206
                                          342/357.23
(Continued)

FOREIGN PATENT DOCUMENTS

JP      09-297171 A     11/1997
JP      2002-214322 A   7/2002
(Continued)

OTHER PUBLICATIONS

Communication dated Nov. 12, 2019, from the European Patent Office in counterpart European Application No. 17774546.0.
(Continued)

*Primary Examiner* — Nathan S Taylor
(74) *Attorney, Agent, or Firm* — Sughrue Mion, PLLC

(57) ABSTRACT

An indoor/outdoor determination program, etc., whereby an indoor or outdoor state can be determined with higher precision than by a determination method based on satellite reception strength in which a threshold value is difficult to set. The indoor/outdoor determination program according to the present invention causes a step to be executed for determining whether a mobile terminal is present indoors or outdoors on the basis of satellite elevation angle information
(Continued)

and/or satellite azimuth angle information acquired directly or indirectly from a satellite receiver provided to the mobile terminal.

9 Claims, 21 Drawing Sheets

(51) Int. Cl.
  *G06F 16/29* (2019.01)
  *G01S 19/13* (2010.01)
  *G01S 19/42* (2010.01)
(58) Field of Classification Search
  CPC ........ G01S 19/22; G01S 19/24; G01S 19/258;
        G01S 19/46; G01S 1/08; G01S 19/25;
        H04W 4/33
  USPC ........................................ 342/357.25, 357.29
  See application file for complete search history.

(56) References Cited

U.S. PATENT DOCUMENTS

| | | | |
|---|---|---|---|
| 8,190,172 B2 | 5/2012 | Shen et al. | |
| 9,584,966 B1* | 2/2017 | Thiel | .................... G01S 5/0252 |
| 2002/0050944 A1* | 5/2002 | Sheynblat | ............... G01S 19/28 342/357.25 |
| 2010/0069057 A1* | 3/2010 | Boiero | .................. H04W 64/00 455/419 |
| 2011/0287784 A1* | 11/2011 | Levin | .................... H04W 64/00 455/456.2 |
| 2013/0169474 A1* | 7/2013 | White | .................... G01S 19/28 342/357.23 |
| 2013/0252631 A1* | 9/2013 | Alizadeh-Shabdiz | ....................... H04W 4/025 455/456.1 |
| 2015/0097731 A1 | 4/2015 | Russell | |
| 2015/0309183 A1* | 10/2015 | Black | .................... G01S 19/258 342/357.25 |
| 2016/0003949 A1* | 1/2016 | Venkataraman | .......... G01S 1/08 342/357.29 |
| 2016/0263435 A1* | 9/2016 | Venkatraman | .......... G01S 19/42 |
| 2017/0212243 A1* | 7/2017 | Darapu | ............. H04B 7/18513 |
| 2019/0094379 A1* | 3/2019 | Chhokra | ................. G01S 19/42 |
| 2020/0191943 A1* | 6/2020 | Wu | ........................ G01S 13/003 |
| 2020/0284883 A1* | 9/2020 | Ferreira | ................ G01S 7/4816 |

FOREIGN PATENT DOCUMENTS

| | | |
|---|---|---|
| JP | 2004-245657 A | 9/2004 |
| JP | 2006-292532 A | 10/2006 |
| JP | 2008-249723 A | 10/2008 |
| JP | 2009-031278 A | 2/2009 |
| JP | 2010-038712 A | 2/2010 |
| JP | 2010-038895 A | 2/2010 |
| JP | 2012-163566 A | 8/2012 |
| JP | 2012-244394 A | 12/2012 |
| JP | 2013-044651 A | 3/2013 |
| JP | 2013-148486 A | 8/2013 |
| JP | 5333228 B2 | 11/2013 |
| RU | 2440590 C2 | 1/2012 |
| WO | 0045191 A2 | 8/2000 |

OTHER PUBLICATIONS

Communication dated Jul. 15, 2019 from the Russian Patent Office in application No. 2018137049/07.
Written Opinion of the International Searching Authority of PCT/JP2017/011313 dated Jun. 20, 2017.
International Search Report of PCT/JP2017/011313 dated Jun. 20, 2017.

* cited by examiner

RECORDING MEDIUM ON WHICH INDOOR/OUTDOOR DETERMINATION PROGRAM IS RECORDED, INDOOR/OUTDOOR DETERMINATION SYSTEM, INDOOR/OUTDOOR DETERMINATION METHOD, MOBILE TERMINAL, AND MEANS FOR CLASSIFYING AND DETERMINING INDOOR/OUTDOOR ENVIRONMENT

CROSS REFERENCE TO RELATED APPLICATIONS

This application is a National Stage of International Application No. PCT/JP2017/011313 filed Mar. 22, 2017, claiming priority based on Japanese Patent Application No. 2016-069713 filed Mar. 30, 2016, the disclosure of which is incorporated herein in its entirety by reference.

TECHNICAL FIELD

The present invention relates to an indoor/outdoor determination program, an indoor/outdoor determination system, an indoor/outdoor determination method, a mobile terminal, and an indoor/outdoor environment classification determination unit that determine whether the mobile terminal exists indoors or outdoors.

BACKGROUND ART

Some mobile terminals such as a mobile terminal with a Global Positioning System (GPS) function have an indoor/outdoor determination function of determining whether the local terminal is positioned indoors or outdoors. The indoor/outdoor determination function makes a determination mainly on the basis of information equivalent to a received signal strength, such as a received signal to noise ratio (SNR) and a signal waveform from each satellite, the information relating to an earlier process in GPS reception, by use of a property of a received GPS signal strength weakening in an indoor environment, a property characterizing a signal strength waveform from a GPS, and the like. Technologies using such an indoor/outdoor determination function include the following.

For example, PTL 1 discloses a technology of making an indoor/outdoor determination depending on whether or not a GPS signal is received. Further, PTL 2 discloses a technology of making an indoor/outdoor determination, based on a reception sensitivity of a signal from a positioning satellite, and the number of captured satellites and a state of change thereof. Further, PTL 3 discloses a technology of making an indoor/outdoor determination depending on whether or not an average strength of signal strengths of satellite signals from a plurality of positioning satellites is within a signal strength range corresponding to indoors and/or within a signal strength range corresponding to outdoors. PTL 3 also discloses a technology of making an indoor/outdoor determination depending on whether or not a signal strength of a satellite signal from a positioning satellite within a high-elevation-angle range is within a predicted strength range. Further, PTL 4 discloses a technology of making an indoor/outdoor determination by use of a representative value and a dispersion value of signals from a plurality of positioning satellites. Further, PTL 5 describes a technology of making an indoor/outdoor determination by use of time required for acquisition of reception quality of a GPS radio wave or GPS positional information. Additionally, PTL 6 discloses a technology of making an indoor/outdoor determination by use of environmental data (at least one of a signal to noise ratio, a signal to interference wave ratio, an input signal strength, a signal attenuation, a correlation function waveform, and a peak width value) indicating a mode locally propagated to a receiver location.

CITATION LIST

Patent Literature

[PTL 1] Japanese Unexamined Patent Application Publication No. 2010-38712
[PTL 2] Japanese Unexamined Patent Application Publication No. 2004-245657
[PTL 3] Japanese Unexamined Patent Application Publication No. 2006-292532
[PTL 4] Japanese Unexamined Patent Application Publication No. 2013-44651
[PTL 5] Japanese Patent No. 5333228
[PTL 6] Japanese Unexamined Patent Application Publication No. 2012-163566
[PTL 7] Japanese Unexamined Patent Application Publication No. 2010-038895

SUMMARY OF INVENTION

Technical Problem

The following analysis is given by the present inventor.
However, when each of the indoor/outdoor determination functions described in PTLs 1 to 6 is applied to a satellite positioning system with a very large number of satellites, signals received from satellites are less likely to weaken in an indoor environment, and therefore it is difficult to set a suitable indoor/outdoor determination threshold value. Specifically, the number of satellites in positioning systems is increasing step by step with leveling of annual investments in positioning systems and a need for enhanced positioning precision as a background. Accordingly, a received GPS signal strength received in an indoor environment increases step by step, and an indoor/outdoor determination threshold value needs to be changed step by step. In other words, derivation and setting of a suitable determination threshold value is required as the number of satellites increases in each of the indoor/outdoor determination functions described in PTLs 1 to 6, and determination precision may degrade unless the determination threshold value is changed as needed.

A main subject of the present invention is to provide an indoor/outdoor determination program, an indoor/outdoor determination system, an indoor/outdoor determination method, a mobile terminal, and an indoor/outdoor environment classification determination unit that are capable of indoor/outdoor determination with higher precision than a determination method based on a satellite reception strength for which threshold value setting is difficult.

Solution to Problem

An indoor/outdoor determination program, according to the first aspect, causes execution of an operation determining, by use of a hardware resource, whether a mobile terminal exists indoors or outdoors, the program causing execution of a step of determining whether the mobile terminal exists indoors or outdoors, based on at least either of satellite elevation angle information and satellite azimuth angle information directly or indirectly acquired from a satellite receiver provided in a mobile terminal.

An indoor/outdoor determination system, according to the second aspect, includes a mobile terminal including a satellite receiver for receiving a satellite signal and also calculating at least either of satellite elevation angle information and satellite azimuth angle information by use of satellite orbit information included in the satellite signal, and indoor/outdoor environment classification determination means that determines whether a mobile terminal exists indoors or outdoors, based on at least either of satellite elevation angle information and satellite azimuth angle information acquired from the satellite receiver; a data server being communicably connected to the mobile terminal through a network and also accumulating data from the mobile terminal; and indoor/outdoor environment classification visualization means that requests data required for generation of indoor/outdoor environment classification data to the data server, generates indoor/outdoor environment classification data by plotting data acquired from the data server on a map, and displays generated indoor/outdoor environment classification data as a geographical distribution.

An indoor/outdoor determination system, according to the third aspect, includes a mobile terminal including a satellite receiver for receiving a satellite signal and also calculating at least either of satellite elevation angle information and satellite azimuth angle information by use of satellite orbit information included in the satellite signal; a data server being communicably connected to the mobile terminal through a network and also accumulating data including at least either of the satellite elevation angle information and the satellite azimuth angle information from the mobile terminal; indoor/outdoor environment classification determination means that determines whether the mobile terminal exists indoors or outdoors, based on at least either of satellite elevation angle information and satellite azimuth angle information acquired from the data server; and indoor/outdoor environment classification visualization means that generates indoor/outdoor environment classification data by plotting data acquired from the data server on a map, based on a determination result acquired from the indoor/outdoor environment classification determination means, and displays generated indoor/outdoor environment classification data as a geographical distribution.

An indoor/outdoor determination method, according to the fourth aspect, for determining whether a mobile terminal exists indoors or outdoors by use of a hardware resource, includes: determining whether the mobile terminal exists indoors or outdoors, based on at least either of satellite elevation angle information and satellite azimuth angle information directly or indirectly acquired from a satellite receiver provided in the mobile terminal.

An mobile terminal, according to the fifth aspect, includes: a satellite receiver for receiving a satellite signal and also calculating at least either of satellite elevation angle information and the satellite azimuth angle information by use of satellite orbit information included in the satellite signal; and indoor/outdoor environment classification determination means that determines whether the mobile terminal exists indoors or outdoors, based on at least either of the satellite elevation angle information and the satellite azimuth angle information acquired from the satellite receiver.

An indoor/outdoor environment classification determination unit, according to the sixth aspect, determines whether a mobile terminal exists indoors or outdoors, based on at least either of satellite elevation angle information and satellite azimuth angle information directly or indirectly acquired from a satellite receiver provided in the mobile terminal.

Advantageous Effects of Invention

The first to sixth aspects enable indoor/outdoor determination with higher precision than a determination method based on a satellite reception strength for which threshold value setting is difficult.

EXAMPLE EMBODIMENT

Figure 1:
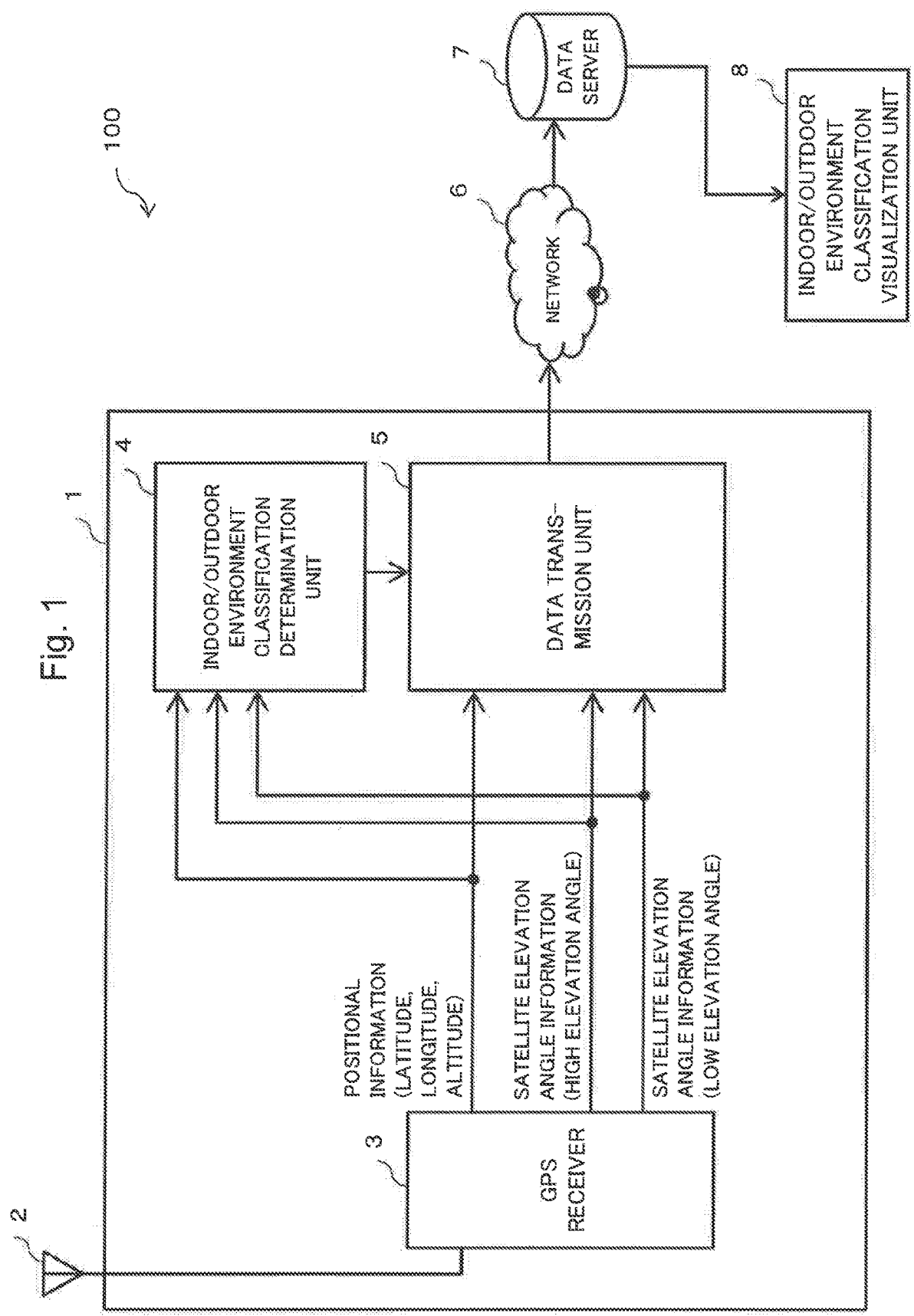
FIG. 1 is a block diagram schematically illustrating a configuration of an indoor/outdoor determination system according to a first example embodiment.

Example embodiments will be described below referring to drawings. Note that reference signs given in the drawings herein are solely for facilitating understanding and are not intended to limit the example embodiments to illustrated modes. The example embodiments described below are just exemplifications and do not limit the present invention.

First Example Embodiment

An indoor/outdoor determination system according to a first example embodiment will be described by use of drawings. FIG. 1 is a block diagram schematically illustrating a configuration of the indoor/outdoor determination system according to the first example embodiment.

The first example embodiment uses a property that an indoor environment often has a window and thus a direction in which a radio wave from a GPS satellite is received has a tendency to incline in a direction of the window, and makes an indoor/outdoor determination (a near-a-window/not-near-a-window determination in the indoor case may be further made), based on information including satellite elevation angle information based on a direction in which a GPS satellite exists, the direction being acquired in a later process in GPS reception.

Note that the indoor environment refers to inside a building made of an artifact. An indoor environment is a location where a person enters and therefore is rarely closed completely. Specifically, in most cases, an indoor environment has a window for lighting and a vent hole for ventilation. In general, a window is made by use of glass and is more likely to pass a radio wave from a GPS satellite compared with a wall surface made of concrete or the like. Further, a vent hole is a part of a path connecting inside and outside of the building, and has a property of being more likely to pass a radio wave compared with a wall surface.

Recent performance enhancement in GPS reception sensitivity allows reception of a radio wave from a GPS satellite getting indoors through such a window or vent hole. In that case, there is a natural but overlooked characteristic that a direction in which a satellite transmitting a receivable radio wave exists has a tendency to incline in a direction of the window or the vent hole. The first example embodiment uses the characteristic for indoor/outdoor determination. Specifically the first example embodiment makes a determination as to whether an indoor or outdoor environment with high precision based on a bias in an elevation angle of a satellite transmitting a radio wave receivable in an indoor environment.

An indoor/outdoor determination system 100 is a system determining whether a mobile terminal 1 exists indoors or outdoors. The indoor/outdoor determination system 100 includes a mobile terminal 1, a network 6, a data server 7, and an indoor/outdoor environment classification visualization unit 8.

The mobile terminal 1 is a portable information communication terminal. The mobile terminal 1 includes a GPS antenna 2, a GPS receiver 3, an indoor/outdoor environment classification determination unit 4, and a data transmission unit 5.

The GPS antenna 2 is a satellite antenna converting a radio wave from a GPS satellite into a GPS signal. The GPS antenna 2 outputs a GPS signal to the GPS receiver 3.

The GPS receiver 3 is equipment receiving a GPS signal (satellite signal) from the GPS antenna 2. The GPS receiver 3 has a function of executing positioning, based on the received GPS signal, and calculating positional information indicating a position where the mobile terminal 1 exists. The GPS receiver 3 has a function of calculating satellite elevation angle information by use of GPS satellite orbit information (orbit information included in the GPS signal). The satellite elevation angle information includes satellite elevation angle information (high elevation angle) indicating an elevation angle of each satellite at a high elevation angle (greater than or equal to 45° and less than or equal to 90°) and satellite elevation angle information (low elevation angle) indicating an elevation angle of each satellite at a low elevation angle (greater than or equal to 0° and less than 45°). The GPS receiver 3 outputs the calculated positional information, satellite elevation angle information (high elevation angle), and satellite elevation angle information (low elevation angle) to each of the indoor/outdoor environment classification determination unit 4 and the data transmission unit 5.

Note that the GPS antenna 2 and the GPS receiver 3 are not limited to those applicable to the Global Positioning System (GPS) currently operated by the U.S.A. but are applicable to any satellite positioning system such as the Global Navigation Satellite System (GLONASS) operated by the Russian Federation. Further, the GPS antenna 2 and the GPS receiver 3 are applicable to a positioning system combining a plurality of different satellite positioning systems.

The indoor/outdoor environment classification determination unit 4 is a functional unit determining an indoor/outdoor environment classification, based on positional information, satellite elevation angle information (high elevation angle), and satellite elevation angle information (low elevation angle) from the GPS receiver 3. The indoor/outdoor environment classification determination unit 4 functions by use of a hardware resource, and may be provided by executing software on a computer or by an integrated circuit. The indoor/outdoor environment classification determination unit 4 outputs determination information about the determined indoor/outdoor environment classification to the data transmission unit 5. A detailed operation of the indoor/outdoor environment classification determination unit 4 will be described later.

The data transmission unit 5 is a functional unit capable of transmitting predetermined data to the data server 7 through the network 6. The data transmission unit 5 is able to transmit data including positional information, satellite elevation angle information (high elevation angle), and satellite elevation angle information (low elevation angle) from the GPS receiver 3, and determination information from the indoor/outdoor environment classification determination unit 4.

The network 6 is a communication network communicably connecting the mobile terminal 1 to the data server 7. Since the mobile terminal 1 is a movable terminal, the network 6 may include a cellular system such as Long Term Evolution (LTE) and wideband code division multiple access (W-CDMA), and further a public wireless local area network (LAN), Bluetooth (registered trademark), and a contactless communication system. Further, the network 6 is not necessarily limited to a wireless network and may include a network connecting by wireline.

The data server 7 is a server accumulating data from the mobile terminal 1. The data server 7 has a function of receiving data transmitted from the mobile terminal 1 through the network 6 and accumulating the received data. The data server 7 has a function of transmitting part of accumulated data to the indoor/outdoor environment classification visualization unit 8 in response to a request from the indoor/outdoor environment classification visualization unit 8.

The indoor/outdoor environment classification visualization unit 8 is a functional unit making indoor/outdoor environment classification data visible to the eye. The indoor/outdoor environment classification visualization unit 8 has a function of requesting data required for generation of indoor/outdoor environment classification data to the data server 7, generating indoor/outdoor environment classification data by plotting the data acquired from the data server 7 on a map, and displaying the generated indoor/outdoor environment classification data as a geographical distribution. The indoor/outdoor environment classification visualization unit 8 has a function of visually displaying relevance of network quality information of the network 6 held in the mobile terminal 1 (e.g. physical quality information such as throughput of an uplink and a downlink, and a signal strength) to indoor/outdoor environment classification data, by presenting, as a geographical distribution, the network quality information of the network 6 in addition to the indoor/outdoor environment classification data.

Next, an operation of the mobile terminal in the indoor/outdoor determination system according to the first example embodiment will be described. Additionally, see FIG. 1 for the components of the mobile terminal.

First, in the mobile terminal 1, the GPS receiver 3 receives a GPS signal supplied from the GPS antenna 2. Next, the GPS receiver 3 executes positioning, based on the received GPS signal. When executing positioning, the GPS receiver 3 calculates positional information (latitude, longitude, altitude) of the mobile terminal 1, based on the received GPS signal, and calculates satellite elevation angle information (high elevation angle) and satellite elevation angle information (low elevation angle), based on satellite orbit information included in the received GPS signal. Next, the GPS receiver 3 outputs information including the calculated positional information (latitude, longitude, altitude), satellite elevation angle information (high elevation angle), and satellite elevation angle information (low elevation angle) to the indoor/outdoor environment classification determination unit 4 and the data transmission unit 5.

Next, the indoor/outdoor environment classification determination unit 4 determines environment classification of whether the mobile terminal 1 is positioned indoors or outdoors, according to a predetermined operation, based on the information including the positional information (latitude, longitude, altitude), the satellite elevation angle information (high elevation angle), and the satellite elevation angle information (low elevation angle) from the GPS receiver 3, and outputs the resulting determination information to the data transmission unit 5. The predetermined operation will be described later.

Next, the data transmission unit 5 transmits, to the data server 7 through the network 6, data including the positional information (latitude, longitude, altitude), the satellite elevation angle information (high elevation angle), and the satellite elevation angle information (low elevation angle) from the GPS receiver 3, and the determination information from the indoor/outdoor environment classification determination unit 4.

Next, the data server 7 receives the data from the data transmission unit 5 and accumulates the received data. Consequently, the data server 7 enters a state in which reception of a data request from the indoor/outdoor environment classification visualization unit 8 is enabled.

The indoor/outdoor environment classification visualization unit 8 requests part of the accumulated data to the data server 7.

Next, in response to the request by the indoor/outdoor environment classification visualization unit 8, the data server 7 transmits part of the accumulated data to the indoor/outdoor environment classification visualization unit 8.

Next, the indoor/outdoor environment classification visualization unit 8 generates indoor/outdoor environment classification data by plotting the data from the data server 7 on a map and displays the generated indoor/outdoor environment classification data as a geographical distribution. At that time, the indoor/outdoor environment classification visualization unit 8 visually displays relevance of network quality information of the network 6 held in the mobile terminal 1 to the indoor/outdoor environment classification data by presenting, as the geographical distribution, the network quality information of the network 6 in addition to the indoor/outdoor environment classification data.

Next, the predetermined operations will be described.

[First Operation]

Figure 2:
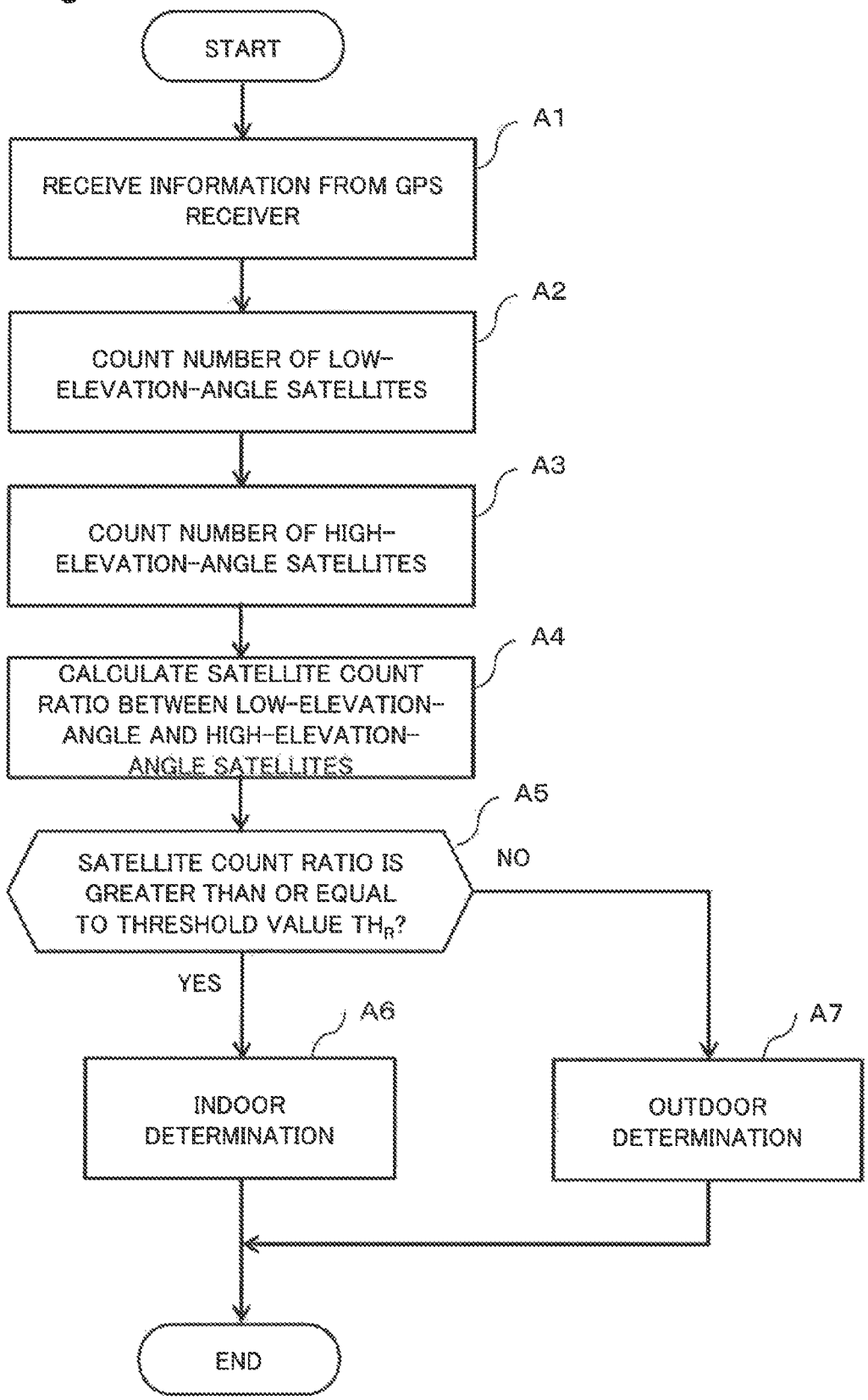
FIG. 2 is a flowchart schematically illustrating a first operation of an indoor/outdoor environment classification determination unit in a mobile terminal in the indoor/outdoor determination system according to the first example embodiment.

A first operation will be described by use of a drawing. FIG. 2 is a flowchart schematically illustrating the first operation of the indoor/outdoor environment classification determination unit in the mobile terminal in the indoor/outdoor determination system according to the first example embodiment. The first operation makes an indoor/outdoor determination, based on a satellite count ratio between high-elevation-angle and low-elevation-angle satellites. Additionally, see FIG. 1 for the components of the mobile terminal.

First, the indoor/outdoor environment classification determination unit 4 receives, from the GPS receiver 3, information including positional information (latitude, longitude, altitude), satellite elevation angle information (high elevation angle), and satellite elevation angle information (low elevation angle) (Step A1).

Next, the indoor/outdoor environment classification determination unit 4 counts the number of low-elevation-angle satellites, based on the positional information (latitude, longitude, altitude) and the satellite elevation angle information (low elevation angle) (Step A2).

Next, the indoor/outdoor environment classification determination unit 4 counts the number of high-elevation-angle satellites, based on the positional information (latitude, longitude, altitude) and the satellite elevation angle information (high elevation angle) (Step A3). In addition, Step A3 may be executed before or simultaneously with Step A2.

Next, the indoor/outdoor environment classification determination unit 4 calculates a satellite count ratio between high-elevation-angle and low-elevation-angle satellites (Step A4). The satellite count ratio between high-elevation-angle and low-elevation-angle satellites is calculated by dividing the number of low-elevation-angle satellites by the number of high-elevation-angle satellites. However, when the number of high-elevation-angle satellites is zero, the value of the satellite count ratio between high-elevation-angle and low-elevation-angle satellites is processed as infinity. The value of the satellite count ratio between high-elevation-angle and low-elevation-angle satellites becomes greater as the number of lower-elevation-angle GPS satellites transmitting receivable radio waves increases.

Next, the indoor/outdoor environment classification determination unit 4 assesses whether the calculated satellite count ratio between high-elevation-angle and low-elevation-angle satellites is greater than or equal to a preset threshold value $TH_R$ (satellite count ratio threshold value) (Step A5).

When the satellite count ratio is greater than or equal to the threshold value $TH_R$ (YES in Step A5), the indoor/outdoor environment classification determination unit 4 determines that the mobile terminal 1 is positioned indoors (Step A6) and ends the operation.

When the satellite count ratio is not greater than or equal to the threshold value $TH_R$, (NO in Step A5), the indoor/outdoor environment classification determination unit 4 determines that the mobile terminal 1 is positioned outdoors (Step A7) and ends the operation.

[Second Operation]

Figure 3:
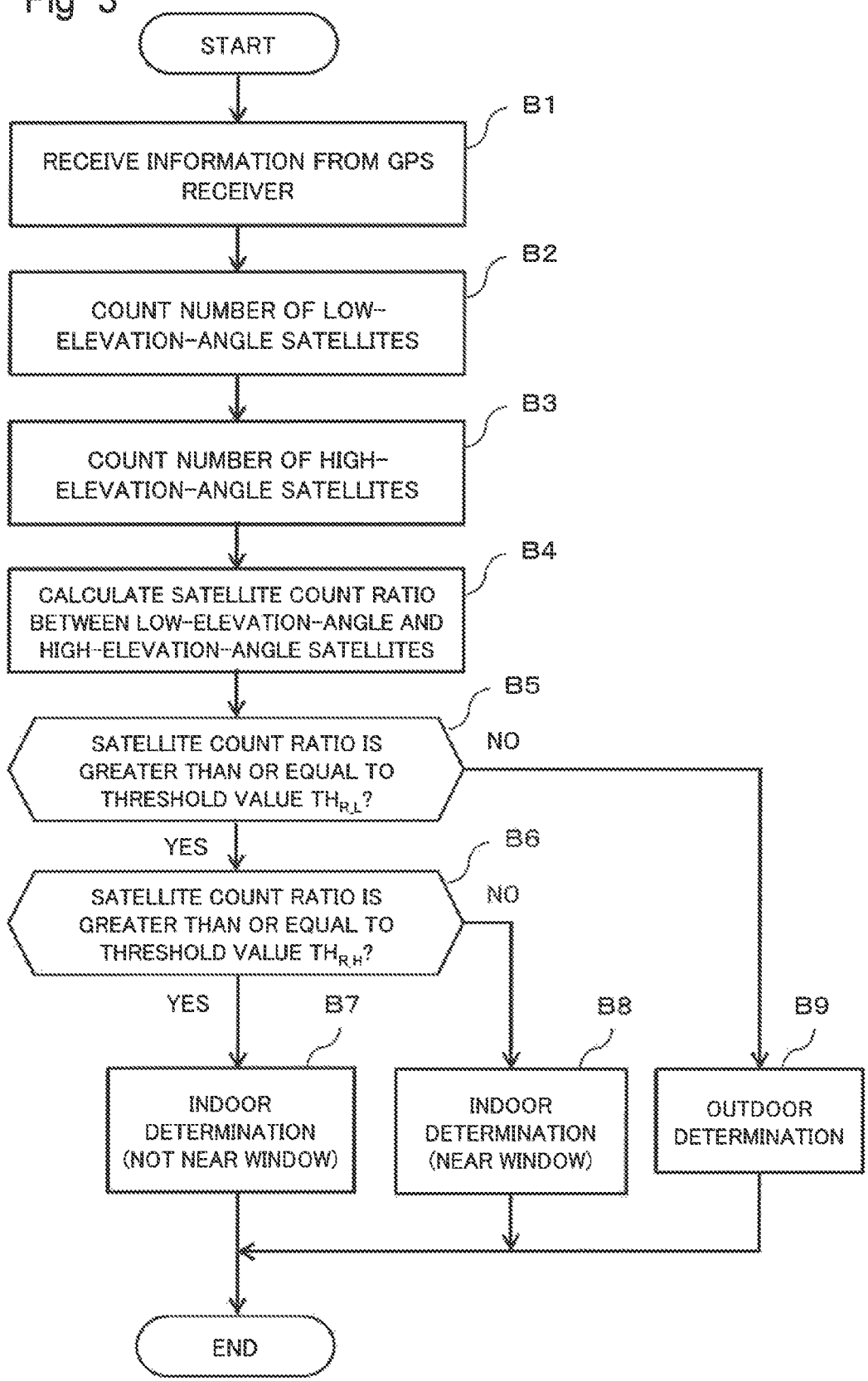
FIG. 3 is a flowchart schematically illustrating a second operation of the indoor/outdoor environment classification determination unit in the mobile terminal in the indoor/outdoor determination system according to the first example embodiment.

A second operation will be described by use of a drawing. FIG. 3 is a flowchart schematically illustrating the second operation of the indoor/outdoor environment classification determination unit in the mobile terminal in the indoor/outdoor determination system according to the first example embodiment. The second operation makes not only an indoor/outdoor determination but also a near-a-window/not-near-a-window determination in the indoor case, based on a satellite count ratio between high-elevation-angle and low-elevation-angle satellites. Additionally, see FIG. 1 for the components of the mobile terminal.

First, after going through Steps B1 to B4 identical to Steps A1 to A4 in FIG. 2, the indoor/outdoor environment classification determination unit 4 assesses whether or not the calculated satellite count ratio between high-elevation-angle and low-elevation-angle satellites is greater than or equal to a preset threshold value $TH_{R\_L}$ (first satellite count ratio threshold value) (Step B5).

When the satellite count ratio is greater than or equal to the threshold value $TH_{R\_L}$ (YES in Step B5), the indoor/outdoor environment classification determination unit 4 assesses whether or not the calculated satellite count ratio between high-elevation-angle and low-elevation-angle satellites is greater than or equal to a preset threshold value $TH_{R\_H}$ (second satellite count ratio threshold value) (Step B6). It is assumed that $TH_{R\_H}$ is greater than $TH_{R\_L}$. The above is based on a property that a satellite count ratio between high-elevation-angle and low-elevation-angle satellites increases as more number of the lower-elevation-angle GPS satellites transmitting receivable radio waves and being not positioned near a window increases.

When the satellite count ratio is greater than or equal to the threshold value $TH_{R\_H}$, (YES in Step B6), the indoor/outdoor environment classification determination unit 4 determines that the mobile terminal 1 is positioned indoors (not near a window) (Step B7) and ends the operation.

When the satellite count ratio is not greater than or equal to the threshold value $TH_{R\_H}$ (NO in Step B6), the indoor/outdoor environment classification determination unit 4 determines that the mobile terminal 1 is positioned indoors (near a window) (Step B8) and ends the operation.

When the satellite count ratio is not greater than or equal to the threshold value $TH_{R\_L}$ (NO in Step B5), the indoor/outdoor environment classification determination unit 4 determines that the mobile terminal 1 is positioned outdoors (Step B9) and ends the operation.

[Third Operation]

Figure 4:
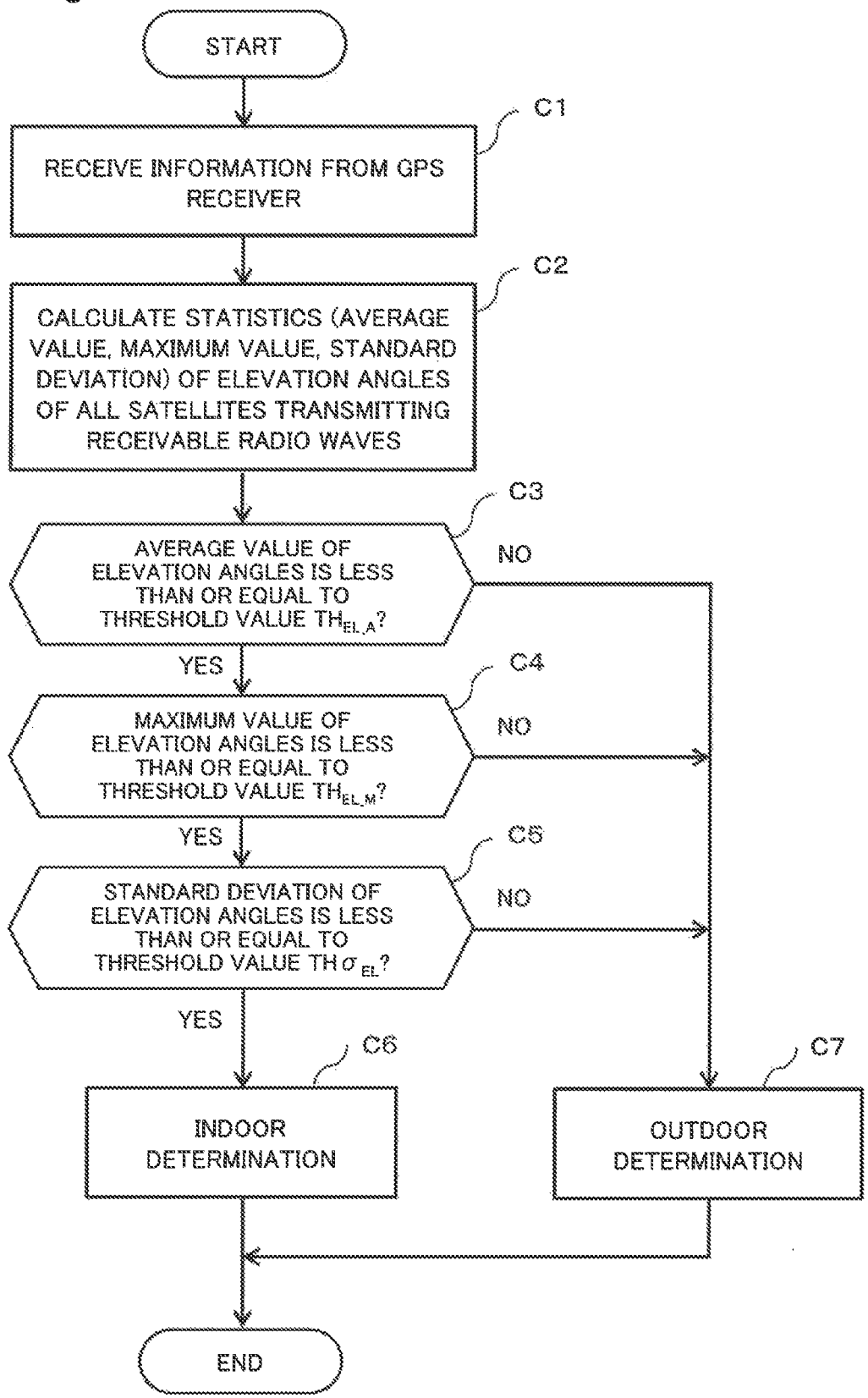
FIG. 4 is a flowchart schematically illustrating a third operation of the indoor/outdoor environment classification determination unit in the mobile terminal in the indoor/outdoor determination system according to the first example embodiment.

A third operation will be described by use of a drawing. FIG. 4 is a flowchart schematically illustrating the third operation of the indoor/outdoor environment classification determination unit in the mobile terminal in the indoor/outdoor determination system according to the first example embodiment. The third operation makes an indoor/outdoor determination, based on statistics (average value, maximum value, standard deviation) of elevation angles of satellites. Additionally, See FIG. 1 for the components of the mobile terminal.

First, after going through Step C1 identical to Step A1 in FIG. 2, the indoor/outdoor environment classification determination unit 4 calculates statistics (average value, maximum value, standard deviation) of elevation angles of all satellites transmitting receivable radio waves, based on positional information (latitude, longitude, altitude), satellite elevation angle information (high elevation angle), and satellite elevation angle information (low elevation angle) (Step C2).

Next, the indoor/outdoor environment classification determination unit 4 assesses whether the calculated average value of elevation angles (average elevation angle) is less than or equal to a preset threshold value $TH_{EL\_A}$ (average elevation angle threshold value) (Step C3).

When the average value of elevation angles is less than or equal to the threshold value $TH_{EL\_A}$ (YES in Step C3), the indoor/outdoor environment classification determination unit 4 assesses whether the calculated maximum value of elevation angles (maximum elevation angle) is less than or equal to a preset threshold value $TH_{EL\_M}$ (maximum elevation angle threshold value) (Step C4).

When the maximum value of elevation angles is less than or equal to the threshold value $TH_{EL\_M}$ (YES in Step C4), the indoor/outdoor environment classification determination unit 4 assesses whether the calculated standard deviation of elevation angles (elevation angle standard deviation) is less than or equal to a preset threshold value $TH\sigma_{EL}$ (elevation angle standard deviation threshold value) (Step C5). Note that Steps C3 to C5 may be reordered.

When the standard deviation of elevation angles is less than or equal to the threshold value $TH\sigma_{EL}$ (YES in Step C5), the indoor/outdoor environment classification determination unit 4 determines that the mobile terminal 1 is positioned indoors (Step C6) and ends the operation.

When the average value of elevation angles is not less than or equal to the threshold value $TH_{EL\_A}$ (NO in Step C3), the maximum value of elevation angles is not less than or equal to the threshold value $TH_{EL\_M}$ (NO in Step C4), or the standard deviation of elevation angles is not less than or equal to the threshold value $TH\sigma_{EL}$ (NO in Step C5), the indoor/outdoor environment classification determination unit 4 determines that the mobile terminal 1 is positioned outdoors (Step C7) and ends the operation.

[Fourth Operation]

Figure 5:
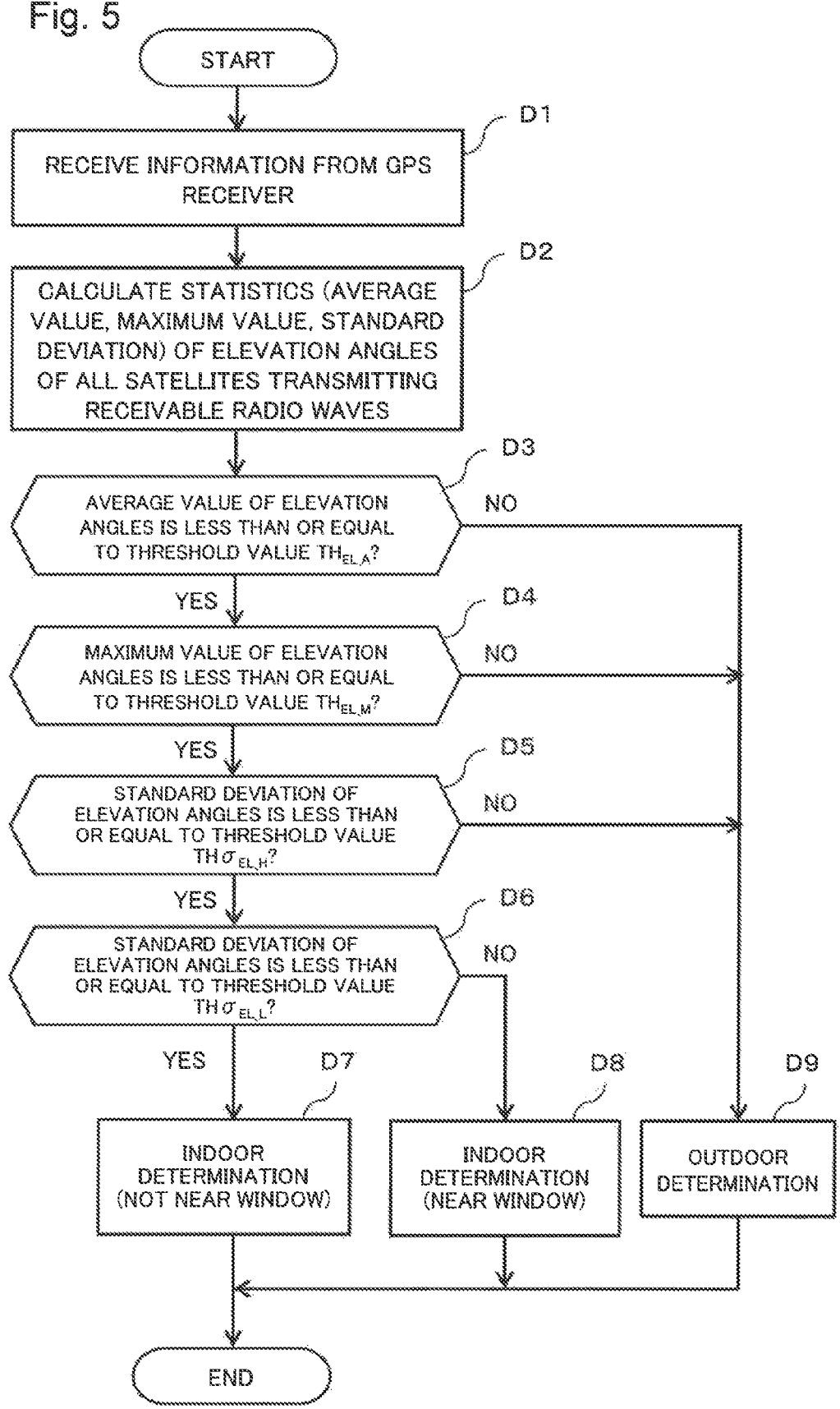
FIG. 5 is a flowchart schematically illustrating a fourth operation of the indoor/outdoor environment classification determination unit in the mobile terminal in the indoor/outdoor determination system according to the first example embodiment.

A fourth operation will be described by use of a drawing. FIG. 5 is a flowchart schematically illustrating the fourth operation of the indoor/outdoor environment classification determination unit in the mobile terminal in the indoor/outdoor determination system according to the first example embodiment. The fourth operation makes not only an indoor/outdoor determination but also a near-a-window/not-near-a-window determination in the indoor case based on statistics (average value, maximum value, standard deviation) of elevation angles of satellites. Additionally, see FIG. 1 for the components of the mobile terminal.

First, after going through Steps D1 to D4 identical to Steps C1 to C4 in FIG. 4, the indoor/outdoor environment classification determination unit 4 assesses whether the calculated standard deviation of elevation angles is less than or equal to a preset threshold value $TH\sigma_{EL\_H}$ (first elevation angle standard deviation threshold value) (Step D5).

When the standard deviation of elevation angles is less than or equal to the threshold value $TH\sigma_{EL\_H}$ (YES in Step D5), the indoor/outdoor environment classification determination unit 4 assesses whether the calculated standard deviation of elevation angles is less than or equal to a preset threshold value $TH\sigma_{EL\_L}$ (second elevation angle standard deviation threshold value) (Step D6). It is assumed that $TH\sigma_{EL\_H}$ is greater than $TH\sigma_{EL\_L}$. The above is based on a property that a standard deviation of elevation angles decreases as a distance from a window increases.

When the standard deviation of elevation angles is less than or equal to the threshold value $TH\sigma_{EL\_L}$ (YES in Step D6), the indoor/outdoor environment classification determination unit 4 determines that the mobile terminal 1 is positioned indoors (not near a window) (Step D7) and ends the operation.

When the standard deviation of elevation angles is not less than or equal to the threshold value $TH\sigma_{EL\_L}$ (NO in Step D6), the indoor/outdoor environment classification determination unit 4 determines that the mobile terminal 1 is positioned indoors (near a window) (Step D8) and ends the operation.

When the average value of elevation angles is not less than or equal to the threshold value $TH_{EL\_A}$ (NO in Step D3), the maximum value of elevation angles is not less than or equal to the threshold value $TH_{EL\_M}$ (NO in Step D4), or the standard deviation of elevation angles is not less than or equal to the threshold value $TH\sigma_{EL\_H}$ (NO in Step D5), the indoor/outdoor environment classification determination unit 4 determines that the mobile terminal 1 is positioned outdoors (Step D9) and ends the operation.

The indoor/outdoor determination system as described above may be used in a field of grasping a geographical distribution of wireless quality in a wireless network. First, a wireless network called a cellular system mainly used for commercial use, such as LTE, W-CDMA, a global system for mobile communications (GSM [registered trademark]) may be cited as the wireless network. Second, a wireless LAN network targeting short-distance communication including uncommercial use may be cited as the wireless network. Third, a wireless network for public use such as the police and a fire department, or private use such as a private enterprise, a wireless communication system not being limited in the network, may be cited as the wireless network.

The first example embodiment provides the following effects.

The first example embodiment is able to provide an indoor/outdoor determination with higher precision than a conventional technology. The reason is that the conventional technology makes an indoor/outdoor determination by use of a received GPS signal strength weakening in an indoor environment and a property characterizing a temporal waveform of the signal strength, and therefore suitable setting of an indoor/outdoor determination threshold value is difficult; whereas the first example embodiment uses, as an indicator, physical statistics indicating a property that a direction of a satellite transmitting a radio wave receivable in a building inclines toward a low elevation angle, the indicator being easily expressed in the manner of physics on the basis of an aperture angle of a window on a vertical plane against the horizon, and therefore is able to provide high-precision indoor/outdoor determination by allowing easy determination threshold value setting.

Further, when applied in a satellite positioning system with a very large number of satellites, the first example embodiment is able to more easily set an indoor/outdoor determination threshold value than the conventional technology. The reason is that, when the conventional technology is applied to a satellite positioning system with a very large number of satellites, received signals from the large number of satellites are not likely to weaken in an indoor environment, and therefore suitable setting of an indoor/outdoor determination threshold value is difficult; whereas the first example embodiment introduces an indicator being a bias in a direction of a satellite transmitting a receivable radio wave, the indicator not being influenced by the number of satellites being large.

Further, according to the first example embodiment, the indicator being a bias in a direction of a satellite transmitting a receivable radio wave has a property that reliability increases as the number of satellites increases, and therefore when applied to a satellite positioning system with a very large number of satellites, the first example embodiment is able to provide an indoor/outdoor determination with higher precision than the conventional technology.

Further, when applied to a positioning system in which satellites are increased step by step, the first example embodiment is able to eliminate the need for step-by-step change or setting of a determination threshold value required by the conventional technology. The reason is that, when the conventional technology is applied to a positioning system in which satellites are increased step by step, a received signal strength from a satellite transmitting a radio wave receivable in an indoor environment increases step by step, and therefore a suitable indoor/outdoor determination threshold value needs to be changed and set step by step, thus making derivation and setting of a suitable determination threshold value difficult; whereas according to the first example embodiment, even in a positioning system in which satellites are increased step by step, the indicator is not influenced by change in the number of satellites, the indicator being a bias value in a direction in which a satellite transmitting a radio wave receivable through a window exists.

Further, since the indicator being a bias value in a direction in which a satellite transmitting a receivable radio wave exists has a property that reliability increases as the number of satellites increases when applied in a positioning system in which the number of satellites is increased step by step, the first example embodiment is able to provide an indoor/outdoor determination with higher precision than the conventional technology.

Further, in addition to indoor/outdoor determination by the conventional technology, the first example embodiment is able to increase types of classification determination in an indoor environment being "indoor not near a window" and "indoor near a window" in terms of the determination for locations of indoors. The reason is that, by use of a property that the closer the indoor position to a window gets, the wider a bias in a direction in which a satellite transmitting a receivable radio wave exists gets, the first example embodiment enables additional near-a-window/not-near-a-window determination in the indoor case by providing a near-a-window determination threshold value in addition to an indoor/outdoor determination threshold value.

Furthermore, the first example embodiment transmits data after determination, by implementing a processing execution entity of indoor/outdoor determination in the mobile terminal 1, and therefore has an advantage that transmitted data are decreased, thus reducing a network load.

Note that, as a background of the first example embodiment, wireless area design such as addition of new base stations and parameter adjustment in existing base stations is performed in order to enhance area quality in a mobile telephone network being a cellular system. In conventional wireless area design, a drive test by a radio wave measuring vehicle equipped with a dedicated measuring instrument is performed, aiming at grasping the present situation and finding a problem that are related to wireless quality. Such a drive test requires driving closely on roads in an area and therefore is a main cause of cost increase in wireless area design. Further, a measurement location being limited to roads passable for a radio wave measuring vehicle causes an insufficient grasp of quality at an indoor location where frequency of phone calls is high.

As another approach for solving the problems, a method of using a common terminal such as a mobile telephone or a smartphone actually used by a user as an alternative to the drive test may be cited. Specifically, a method of causing a common terminal to measure wireless quality such as a received electric field strength and a signal to interference noise ratio (SINR) in a cell and report the measurement result to a network management system along with positional information may be cited. Such a quality measurement technology using a common terminal has raised expectations in the industry and is standardized as Minimization of Drive Test (MDT) in the 3rd Generation Partnership Project (3GPP).

Meanwhile, in general, wireless quality of a macro base station installed outdoors is lower indoors than outdoors due to influence of transmission loss caused by a building. There are many cases in which it is difficult to solve the problem of indoor wireless quality by parameter change in an existing macro base station, and in such a case, an individual measure such as installation of an indoor base station (a femto-base station or a pico-base station) is implemented. Additionally, when a location near a window indoors where wireless quality is poor is found, a suitable assessment of increasing a macro base station installed outdoors instead of an indoor base station may be made, and therefore grasping positional information such as near a window or not near a window indoors has been desired.

Thus, it is effective to separately handle outdoor quality and indoor quality from a viewpoint of wireless area design. Accordingly, when assuming utilization of quality measurement data by a common terminal for wireless area design, it is desirable that outdoor measurement data and indoor measurement data be handled separately. The first example embodiment has been devised in view of the background described above.

Second Example Embodiment

Figure 6:
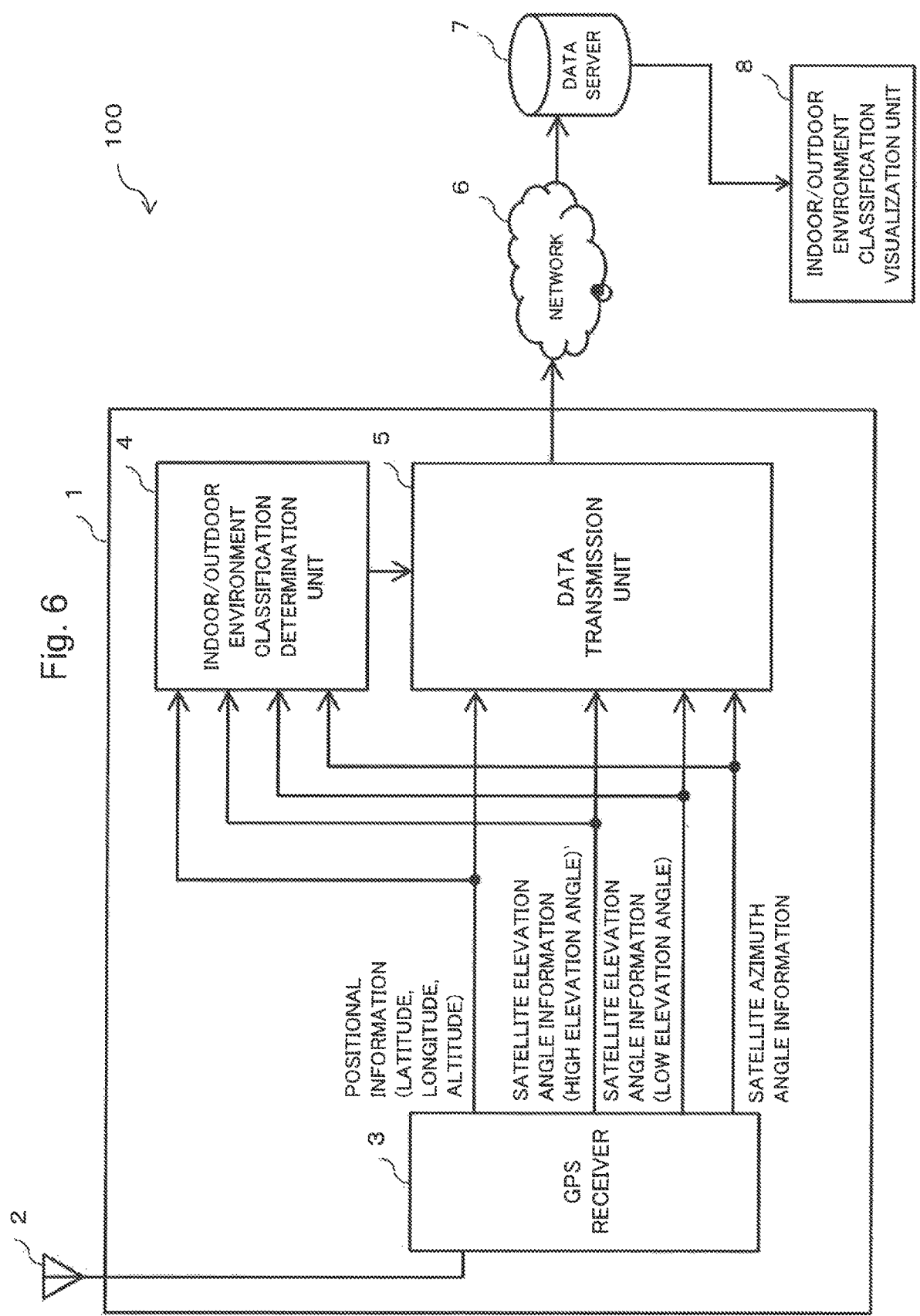
FIG. 6 is a block diagram schematically illustrating a configuration of an indoor/outdoor determination system according to a second example embodiment.

An indoor/outdoor determination system according to a second example embodiment will be described by use of drawings. FIG. 6 is a block diagram schematically illustrating a configuration of the indoor/outdoor determination system according to the second example embodiment.

The second example embodiment is a modified example of the first example embodiment (see FIG. 1) and makes an indoor/outdoor determination (a near-a-window/not-near-a-window determination in the indoor case may be further made), based on information including information about an azimuth angle of a GPS satellite (satellite azimuth angle information). A GPS receiver 3 has a function of calculating satellite azimuth angle information by use of satellite orbit information included in a GPS signal from a GPS antenna 2. The GPS receiver 3 outputs information including the calculated satellite azimuth angle information to each of an indoor/outdoor environment classification determination unit 4 and a data transmission unit 5. The indoor/outdoor environment classification determination unit 4 has a function of determining indoor/outdoor environment classification, based on information including satellite azimuth angle information. The data transmission unit 5 is able to transmit data including satellite azimuth angle information. The remaining configuration is similar to that according to the example embodiment 1.

With regard to an operation of a mobile terminal 1 in the indoor/outdoor determination system according to the second example embodiment, the GPS receiver 3 outputs information including satellite azimuth angle information to the indoor/outdoor environment classification determination unit 4 and the data transmission unit 5. Next, the indoor/outdoor environment classification determination unit 4 receives the information including the satellite azimuth angle information from the GPS receiver 3, determines environment classification of a position where the mobile terminal 1 exists, according to a predetermined operation, based on the received information, and outputs the resulting determination information to the data transmission unit 5. Note that the predetermined operation will be described later. The remaining operation is similar to that according to the example embodiment 1.

Figure 7:
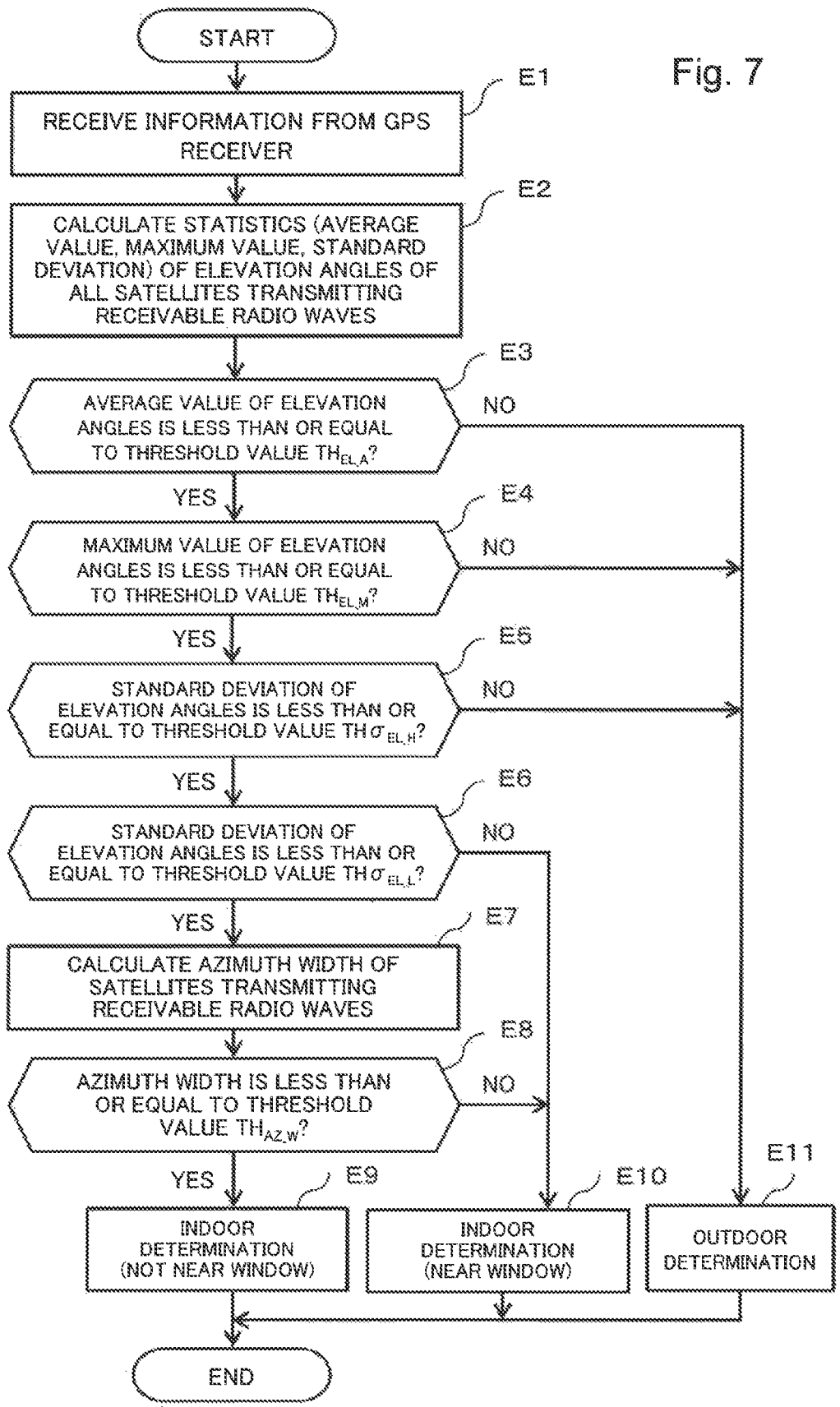
FIG. 7 is a flowchart schematically illustrating a first operation of an indoor/outdoor environment classification determination unit in a mobile terminal in the indoor/outdoor determination system according to the second example embodiment.

Next, the predetermined operations will be described.
[First Operation]
A first operation will be described by use of a drawing. FIG. 7 is a flowchart schematically illustrating the first operation of the indoor/outdoor environment classification determination unit in the mobile terminal in the indoor/outdoor determination system according to the second example embodiment. The first operation not only makes indoor/outdoor and near-a-window/not-near-a-window determinations, based on statistics (average value, maximum value, standard deviation) of elevation angles of satellites, but also makes a near-a-window/not-near-a-window determination, based on an azimuth width of satellites. Additionally, see FIG. 6 for the components of the mobile terminal.

First, after going through Steps E1 to E6 identical to Steps D1 to D6 in FIG. 5, when the standard deviation of elevation angles is less than or equal to the threshold value $TH\sigma_{EL\_L}$ (YES in Step E6), the indoor/outdoor environment classification determination unit 4 calculates an azimuth width of satellites transmitting receivable radio waves (Step E7).

Next, the indoor/outdoor environment classification determination unit 4 assesses whether the calculated azimuth width is less than or equal to a preset threshold value $TH_{AZ\_W}$ (Step E8).

When the azimuth width is less than or equal to the threshold value $TH_{AZ\_W}$ (YES in Step E8), the indoor/outdoor environment classification determination unit 4 determines that the mobile terminal 1 is positioned indoors (not near a window) (Step E9) and ends the operation.

When the standard deviation of elevation angles is not less than or equal to the threshold value $TH\sigma_{EL\_L}$ (NO in Step E6), or the azimuth width is not less than or equal to the threshold value $TH_{AZ\_W}$ (NO in Step E8), the indoor/outdoor environment classification determination unit 4 determines that the mobile terminal 1 is positioned indoors (near a window) (Step E10) and ends the operation.

When the average value of elevation angles is not less than or equal to the threshold value $TH_{EL\_A}$ (NO in Step E3), the maximum value of elevation angles is not less than or equal to the threshold value $TH_{EL\_M}$ (NO in Step E4), or the standard deviation of elevation angles is not less than or equal to the threshold value $TH\sigma_{EL\_H}$ (NO in Step E5), the indoor/outdoor environment classification determination unit 4 determines that the mobile terminal 1 is positioned outdoors (Step E11) and ends the operation.

[Second Operation]

Figure 8:
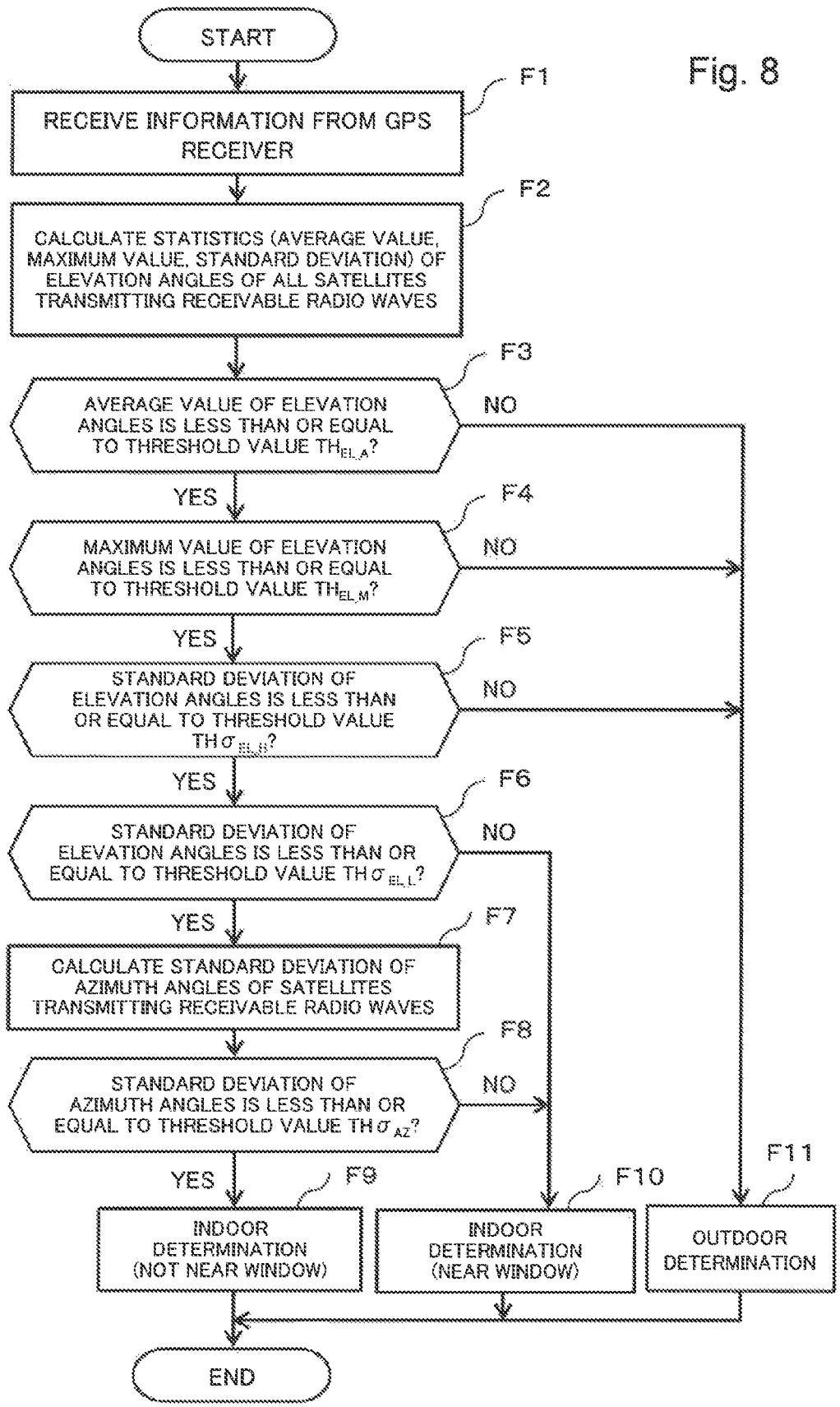
FIG. 8 is a flowchart schematically illustrating a second operation of the indoor/outdoor environment classification determination unit in the mobile terminal in the indoor/outdoor determination system according to the second example embodiment.

A second operation will be described by use of a drawing. FIG. 8 is a flowchart schematically illustrating the second operation of the indoor/outdoor environment classification determination unit in the mobile terminal in the indoor/outdoor determination system according to the second example embodiment. The second operation not only makes indoor/outdoor and near-a-window/not-near-a-window determinations, based on statistics (average value, maximum value, standard deviation) of elevation angles of satellites, but also makes a near-a-window/not-near-a-window determination, based on a standard deviation of azimuth angles of the satellites. Additionally, see FIG. 6 for the components of the mobile terminal.

First, after going through Steps F1 to F6 identical to Steps E1 to E6 in FIG. 7, when the standard deviation of elevation angles is less than or equal to the threshold value $TH\sigma_{EL\_L}$ (YES in Step F6), the indoor/outdoor environment classification determination unit 4 calculates a standard deviation of azimuth angles of the satellites transmitting receivable radio waves (azimuth angle standard deviation) (Step F7).

Next, the indoor/outdoor environment classification determination unit 4 assesses whether the calculated standard deviation of azimuth angles is less than or equal to a preset threshold value $TH\sigma_{AZ}$ (azimuth angle standard deviation threshold value) (Step F8).

When the standard deviation of azimuth angles is less than or equal to the threshold value $TH\sigma_{AZ}$ (YES in Step F8), the indoor/outdoor environment classification determination unit 4 determines that the mobile terminal 1 is positioned indoors (not near a window) (Step F9) and ends the operation.

When the standard deviation of elevation angles is not less than or equal to the threshold value $TH\sigma_{EL\_L}$ (NO in Step F6) or the standard deviation of azimuth angles is not less than or equal to the threshold value $TH\sigma_{AZ}$ (NO in Step F8), the indoor/outdoor environment classification determination unit 4 determines that the mobile terminal 1 is positioned indoors (near a window) (Step F10) and ends the operation.

When the average value of elevation angles is not less than or equal to the threshold value $TH_{EL\_A}$ (NO in Step F3), the maximum value of elevation angles is not less than or equal to the threshold value $TH_{EL\_M}$ (NO in Step F4), or the standard deviation of elevation angles is not less than or equal to the threshold value $TH\sigma_{EL\_H}$ (NO in Step F5), the indoor/outdoor environment classification determination unit 4 determines that the mobile terminal 1 is positioned outdoors (Step F11) and ends the operation.

[Third Operation]

Figure 9:
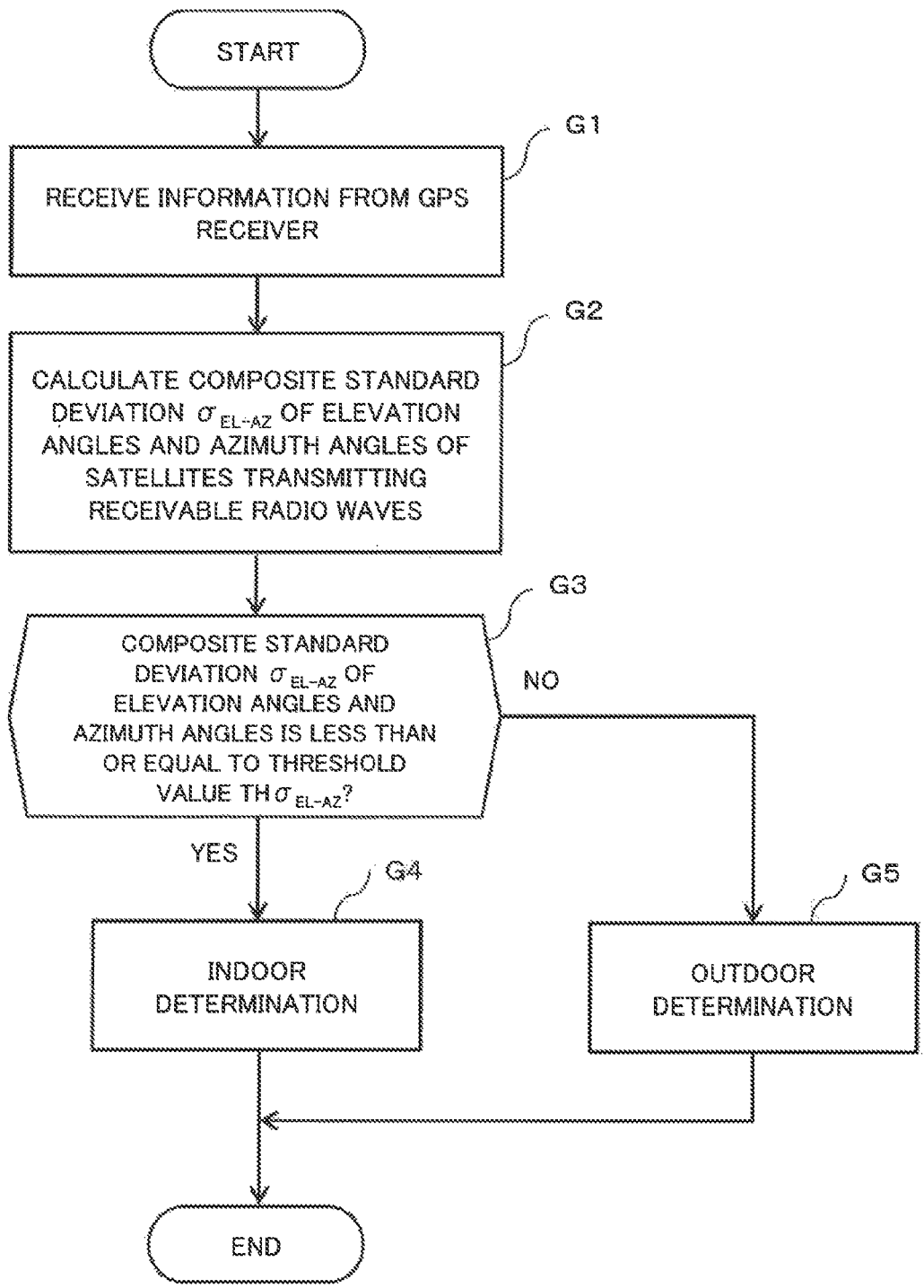
FIG. 9 is a flowchart schematically illustrating a third operation of the indoor/outdoor environment classification determination unit in the mobile terminal in the indoor/outdoor determination system according to the second example embodiment.

A third operation will be described by use of a drawing. FIG. 9 is a flowchart schematically illustrating the third operation of the indoor/outdoor environment classification determination unit in the mobile terminal in the indoor/outdoor determination system according to the second example embodiment. The third operation makes an indoor/outdoor determination, based on a composite standard deviation of elevation angles and azimuth angles of satellites. Additionally, see FIG. 6 for the components of the mobile terminal.

First, after going through Step G1 identical to Step E1 in FIG. 7, the indoor/outdoor environment classification determination unit 4 calculates a composite standard deviation $\sigma_{EL-AZ}$ of elevation angles and azimuth angles of satellites transmitting receivable radio waves (Step G2). Note that the composite standard deviation $\sigma_{EL-AZ}$ is expressed by Math. 1 below. Also note that, when a radio wave from a satellite is not received, the composite standard deviation $\sigma_{EL-AZ}$ is 0.

$$\sigma_{EL-AZ} = \sqrt{\text{(standard deviation of elevation angles)}^2 + \text{(standard deviation of azimuth angles)}^2} \quad \text{Math. 1}$$

Next, the indoor/outdoor environment classification determination unit 4 assesses whether the calculated composite standard deviation $\sigma_{EL-AZ}$ of elevation angles and azimuth angles is less than or equal to a preset threshold value $TH\sigma_{EL-AZ}$ (composite standard deviation threshold value) (Step G3).

When the composite standard deviation $\sigma_{EL-AZ}$ of elevation angles and azimuth angles is less than or equal to the threshold value $TH\sigma_{EL-AZ}$ (YES in Step G3), the indoor/outdoor environment classification determination unit 4 determines that the mobile terminal 1 is positioned indoors (Step G4) and ends the operation.

When the composite standard deviation $\sigma_{EL-AZ}$ of elevation angles and azimuth angles is not less than or equal to the threshold value $TH\sigma_{EL-AZ}$ (NO in Step G3), the indoor/outdoor environment classification determination unit 4 determines that the mobile terminal 1 is positioned outdoors (Step G5) and ends the operation.

[Fourth Operation]

Figure 10:
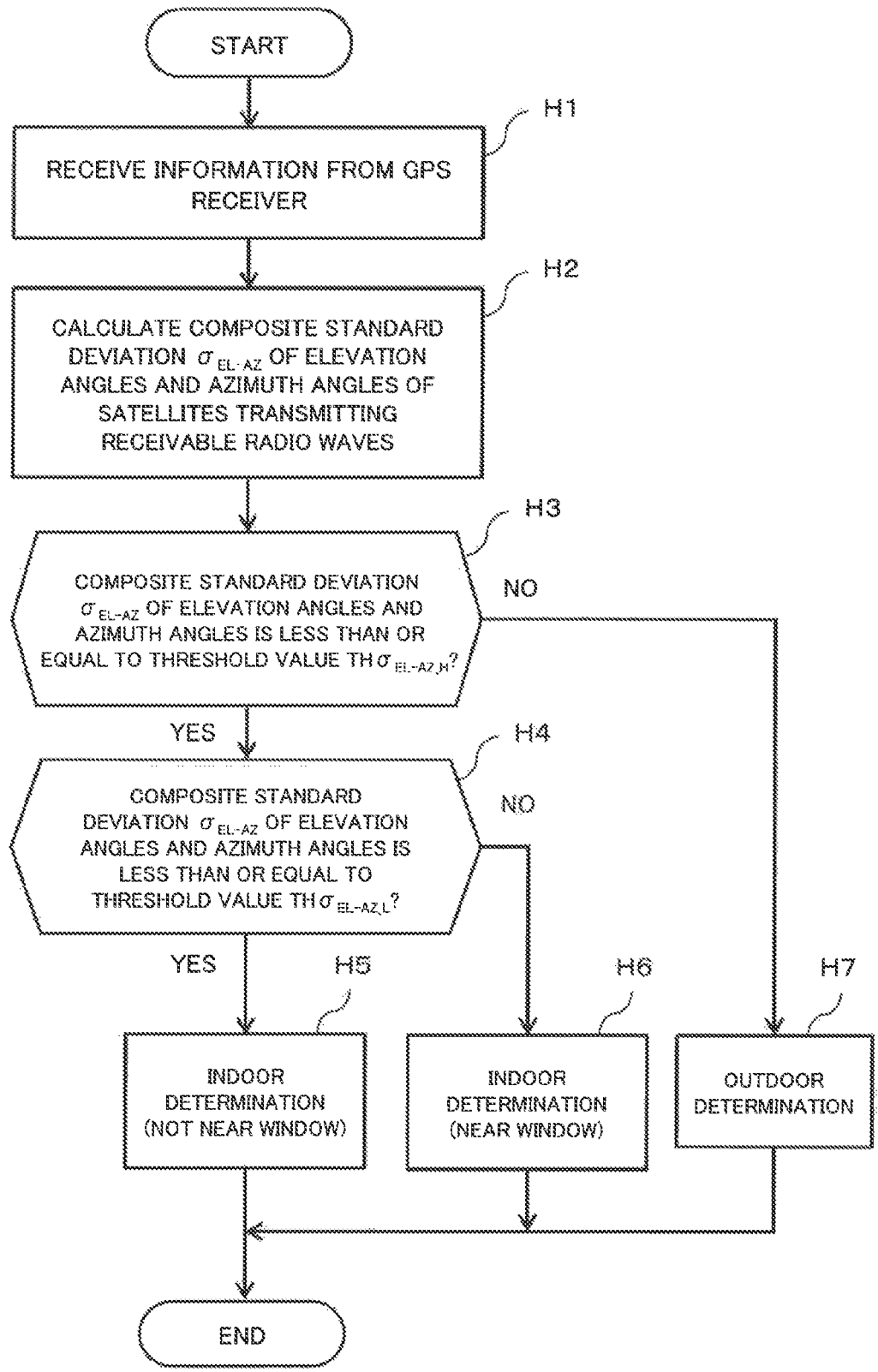
FIG. 10 is a flowchart schematically illustrating a fourth operation of the indoor/outdoor environment classification determination unit in the mobile terminal in the indoor/outdoor determination system according to the second example embodiment.

A fourth operation will be described by use of a drawing. FIG. 10 is a flowchart schematically illustrating the fourth operation of the indoor/outdoor environment classification determination unit in the mobile terminal in the indoor/outdoor determination system according to the second example embodiment. The fourth operation not only makes an indoor/outdoor determination but also makes a near-a-window/not-near-a-window determination in the indoor case, based on a composite standard deviation of elevation angles and azimuth angles of satellites. Additionally, see FIG. 6 for the components of the mobile terminal.

First, after going through Steps H1 and H2 identical to Steps G1 and G2 in FIG. 9, the indoor/outdoor environment classification determination unit 4 assesses whether the calculated composite standard deviation $\sigma_{EL\text{-}AZ}$ of elevation angles and azimuth angles is less than or equal to a preset threshold value $TH\sigma_{EL\text{-}AZ\_H}$ (Step H3).

When the composite standard deviation $\sigma_{EL\text{-}AZ}$ of elevation angles and azimuth angles is less than or equal to the threshold value $TH\sigma_{EL\text{-}AZ\_H}$ (YES in Step H3), the indoor/outdoor environment classification determination unit 4 assesses whether the calculated composite standard deviation $\sigma_{EL\text{-}AZ}$ of elevation angles and azimuth angles is less than or equal to a preset threshold value $TH\sigma_{EL\text{-}AZ\_L}$ (Step H4). It is assumed that $TH\sigma_{EL\text{-}AZ\_H}$ is greater than $TH\sigma_{EL\text{-}AZ\_L}$.

When the composite standard deviation $\sigma_{EL\text{-}AZ}$ of elevation angles and azimuth angles is less than or equal to the threshold value $TH\sigma_{EL\text{-}AZ\_L}$ (YES in Step H4), the indoor/outdoor environment classification determination unit 4 determines that the mobile terminal 1 is positioned indoors (not near a window) (Step H5) and ends the operation.

When the composite standard deviation $\sigma_{EL\text{-}AZ}$ of elevation angles and azimuth angles is not less than or equal to the threshold value $TH\sigma_{EL\text{-}AZ\_L}$ (NO in Step H4), the indoor/outdoor environment classification determination unit 4 determines that the mobile terminal 1 is positioned indoors (near a window) (Step H6) and ends the operation.

When the composite standard deviation $\sigma_{EL\text{-}AZ}$ of elevation angles and azimuth angles is not less than or equal to the threshold value $TH\sigma_{EL\text{-}AZ\_H}$ (NO in Step H3), the indoor/outdoor environment classification determination unit 4 determines that the mobile terminal 1 is positioned outdoors (Step H7) and ends the operation.

[Fifth Operation]

Figure 11:
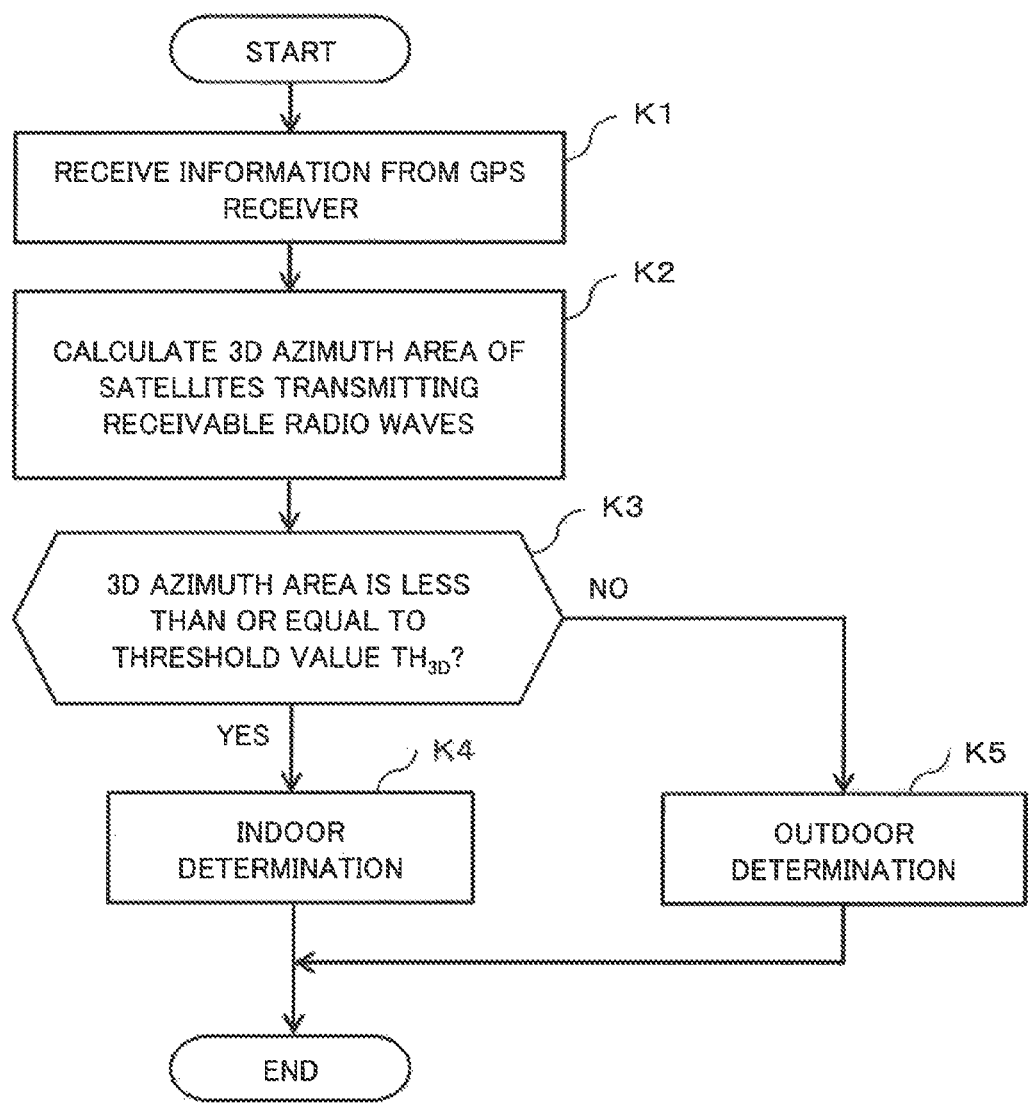
FIG. 11 is a flowchart schematically illustrating a fifth operation of the indoor/outdoor environment classification determination unit in the mobile terminal in the indoor/outdoor determination system according to the second example embodiment.
Figure 12:
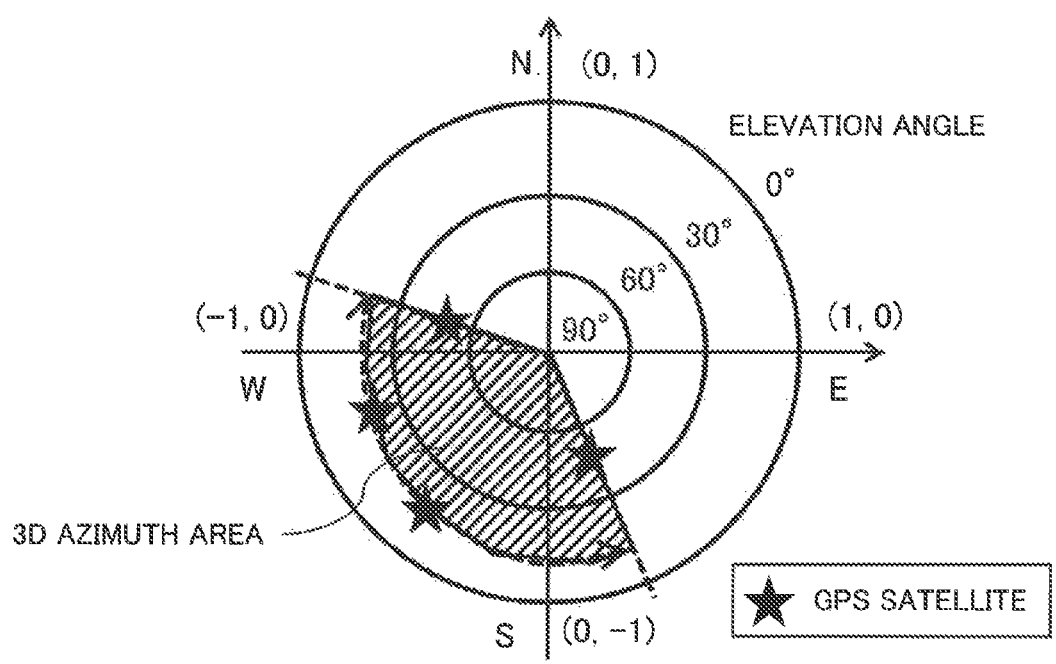
FIG. 12 is a sky plot of GPS satellites for illustrating a 3D azimuth area calculated in the fifth operation of the indoor/outdoor environment classification determination unit in the mobile terminal in the indoor/outdoor determination system according to the second example embodiment.

A fifth operation will be described by use of drawings. FIG. 11 is a flowchart schematically illustrating the fifth operation of the indoor/outdoor environment classification determination unit in the mobile terminal in the indoor/outdoor determination system according to the second example embodiment. FIG. 12 is a sky plot of GPS satellites for illustrating a three dimensional (3D) azimuth area calculated in the fifth operation of the indoor/outdoor environment classification determination unit in the mobile terminal in the indoor/outdoor determination system according to the second example embodiment. The fifth operation makes an indoor/outdoor determination, based on a 3D azimuth area of satellites. Additionally, see FIG. 6 for the components of the mobile terminal.

First, after going through Step K1 identical to Step H1 in FIG. 10, the indoor/outdoor environment classification determination unit 4 calculates a 3D azimuth area of satellites transmitting receivable radio waves (Step K2).

Note that, for example, a 3D azimuth area of satellites can be calculated by an area of a shaded part illustrated in FIG. 12. Specifically, in FIG. 12, elevation angles and azimuth angles of all satellites transmitting receivable radio waves are plotted on plane coordinates called a sky plot in which coordinates of east at an elevation angle 0 are denoted as (1,0), coordinates of west are denoted as (−1,0), coordinates of south are denoted as (0,−1), and coordinates of the zenith are denoted as (0,0), and then, a minimum sector area on the sky plot including coordinates of all the satellites is found. Note that the minimum sector is assumed to be a sector centered around the coordinates (0, 0) of the zenith.

Next, the indoor/outdoor environment classification determination unit 4 assesses whether the calculated 3D azimuth area is less than or equal to a preset threshold value $TH_{3D}$ (3D azimuth area threshold value) (Step K3).

When the 3D azimuth area is less than or equal to the threshold value $TH_{3D}$ (YES in Step K3), the indoor/outdoor environment classification determination unit 4 determines that the mobile terminal 1 is positioned indoors (Step K4) and ends the operation.

When the 3D azimuth area is not less than or equal to the threshold value $TH_{3D}$ (NO in Step K3), the indoor/outdoor environment classification determination unit 4 determines that the mobile terminal 1 is positioned outdoors (Step K5) and ends the operation.

[Sixth Operation]

Figure 13:
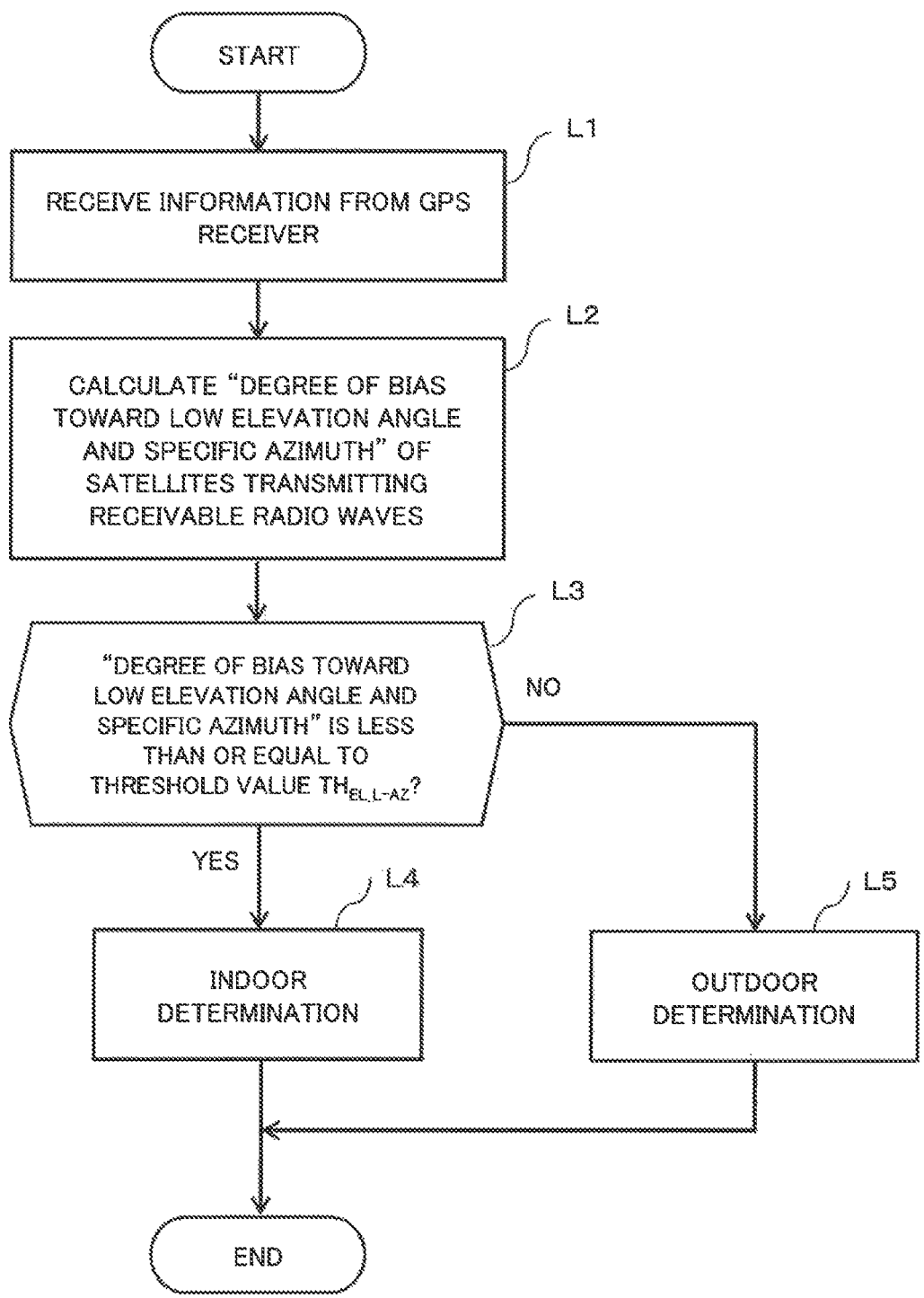
FIG. 13 is a flowchart schematically illustrating a sixth operation of the indoor/outdoor environment classification determination unit in the mobile terminal in the indoor/outdoor determination system according to the second example embodiment.
Figure 14:
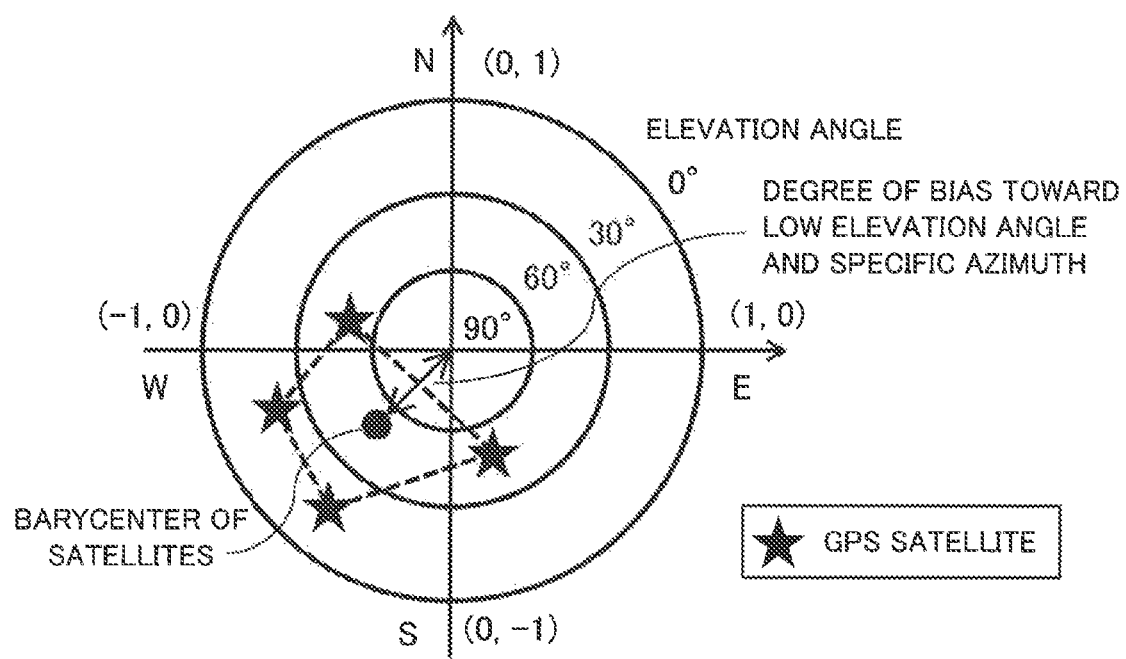
FIG. 14 is a sky plot of GPS satellites for illustrating a degree of bias toward a low elevation angle and a specific azimuth, the degree being calculated in the sixth operation of the indoor/outdoor environment classification determination unit in the mobile terminal in the indoor/outdoor determination system according to the second example embodiment.

A sixth operation will be described by use of drawings. FIG. 13 is a flowchart schematically illustrating the sixth operation of the indoor/outdoor environment classification determination unit in the mobile terminal in the indoor/outdoor determination system according to the second example embodiment. FIG. 14 is a sky plot of GPS satellites for illustrating a degree of bias toward a low elevation angle and a specific azimuth, the bias being calculated in the sixth operation of the indoor/outdoor environment classification determination unit in the mobile terminal in the indoor/outdoor determination system according to the second example embodiment. The sixth operation makes an indoor/outdoor determination, based on a degree of bias of satellites toward a low elevation angle and a specific direction. Additionally, see FIG. 6 for the components of the mobile terminal.

First, after going through Step L1 identical to Step K1 in FIG. 11, the indoor/outdoor environment classification determination unit 4 calculates a degree of bias of satellites transmitting receivable radio waves toward a low elevation angle (e.g. greater than or equal to 0° and less than) 45° and a specific direction (Step K2).

Note that, for example, subsequently to plotting all satellites transmitting receivable radio waves on plane coordinates called a sky plot described in FIG. 12 and finding a barycenter of the satellite coordinates, the degree of bias of satellites toward a low elevation angle and a specific direction is defined as a distance between the barycenter of the satellite coordinates and zenith coordinates, as illustrated in FIG. 14. The defined value indicates that, as the distance between the barycenter of the satellite coordinates and the zenith coordinates becomes longer, that is, increases, the satellites incline more toward a low elevation angle and a specific azimuth.

Next, the indoor/outdoor environment classification determination unit 4 assesses whether the calculated degree of bias toward a low elevation angle and a specific direction is less than or equal to a preset threshold value $TH_{EL\_L\text{-}AZ}$ (degree of bias threshold value) (Step L3).

When the degree of bias toward a low elevation angle and a specific direction is less than or equal to the threshold value $TH_{EL\_L\text{-}AZ}$ (YES in Step L3), the indoor/outdoor environment classification determination unit 4 determines that the mobile terminal 1 is positioned indoors (Step L4) and ends the operation.

When the degree of bias toward a low elevation angle and a specific direction is not less than or equal to the threshold value $TH_{EL\_L\text{-}AZ}$ (NO in Step L3), the indoor/outdoor environment classification determination unit 4 determines that the mobile terminal 1 is positioned outdoors (Step L5) and ends the operation.

The second example embodiment is able to provide an indoor/outdoor determination with yet higher precision than the first example embodiment. The reason is that the second example embodiment adds a determination indicator being an aperture angle on a horizontal plane in a direction toward a window of a building from the inside, in addition to an aperture angle of the window on a vertical plane illustrated in the first example embodiment, and therefore is able to more precisely grasp indoor characteristics and make an indoor/outdoor determination.

Third Example Embodiment

Figure 15:
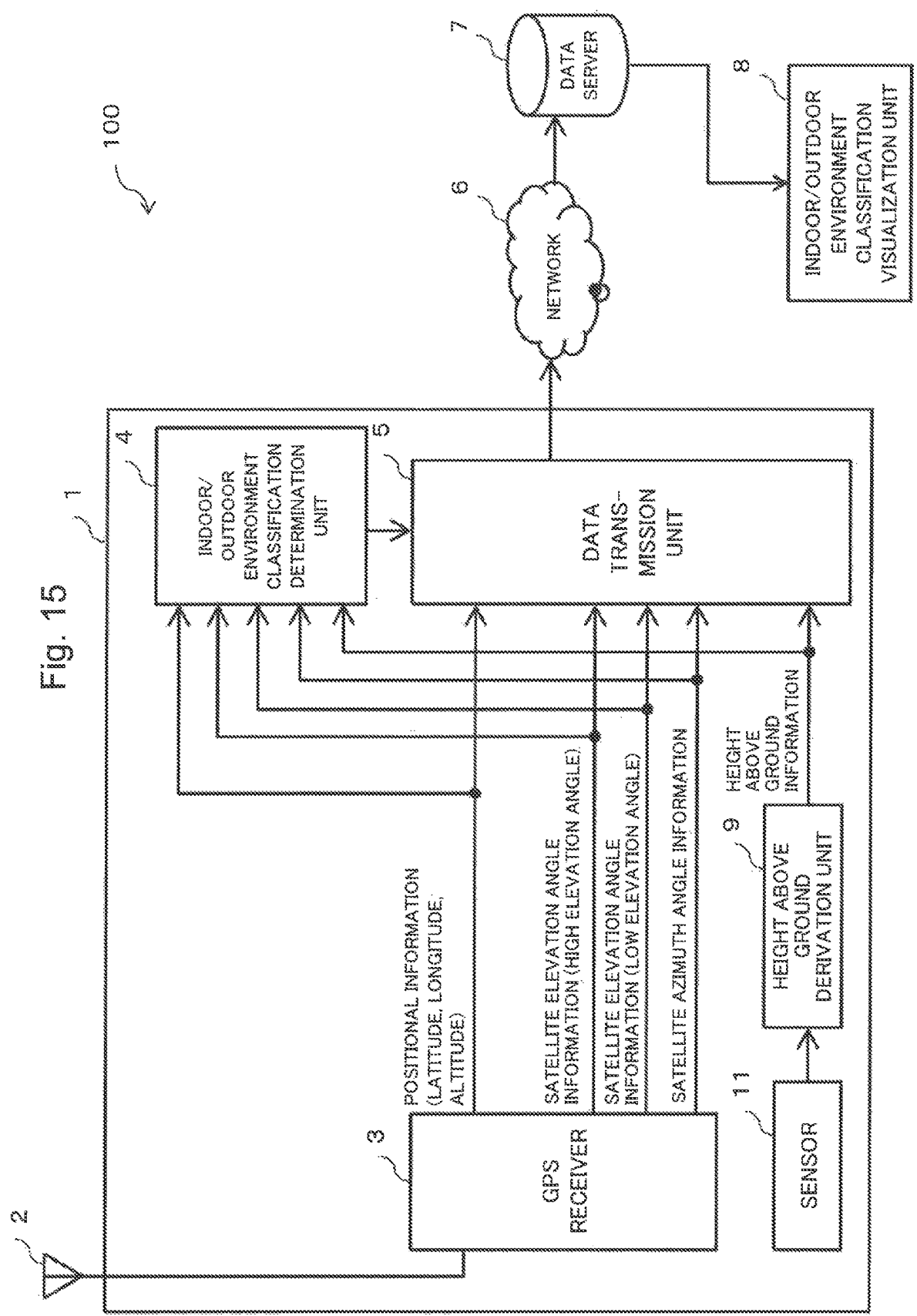
FIG. 15 is a block diagram schematically illustrating a configuration of an indoor/outdoor determination system according to a third example embodiment.

An indoor/outdoor determination system according to a third example embodiment will be described by use of drawings. FIG. 15 is a block diagram schematically illustrating a configuration of the indoor/outdoor determination system according to the third example embodiment.

The third example embodiment is a modified example of the second example embodiment (see FIG. 6) and makes an indoor/outdoor determination and a near-a-window/not-near-a-window determination in the indoor case, based on information including height above ground information of where a mobile terminal 1 exists. The mobile terminal 1 includes a height above ground derivation unit 9 and a sensor 11 as means of acquiring height above ground information.

The height above ground derivation unit 9 is a functional unit deriving a height above ground by use of information (e.g. atmospheric pressure) detected by the sensor 11. The height above ground derivation unit 9 outputs the derived height above ground information to an indoor/outdoor environment classification determination unit 4 and a data transmission unit 5. The height above ground derivation unit 9 may be provided by a computer executing software or by an integrated circuit.

For example, an atmospheric pressure sensor detecting atmospheric pressure may be used as the sensor 11. In that case, a height above ground may be calculated from atmospheric pressure information detected by the atmospheric pressure sensor. Further, for example, a beacon sensor receiving beacon information (including height above ground information) may be used as the sensor 11, the beacon sensor being installed at a predetermined height above ground. In that case, since beacon information received by the beacon sensor includes height above ground information, the beacon information may be used as-is. Further, for example, an acceleration sensor may be used as the sensor 11. In the case of the acceleration sensor, height above ground information can be calculated by time-integrating upward acceleration into speed information with a known location as a starting point and further performing time integration in order to find an upward movement distance. Additionally, the number of the sensor 11 is not limited to one, and a plurality of sensors described above may be combined in order to calculate high-precision height above ground information.

The indoor/outdoor environment classification determination unit 4 has a function of determining indoor/outdoor environment classification, based on information including height above ground information. The data transmission unit 5 is able to transmit data including height above ground information. The remaining configuration is similar to that according to the example embodiment 2. Further, a determination technique using height above ground information such as the third example embodiment may be applied to the first example embodiment.

With regard to an operation of the mobile terminal 1 in the indoor/outdoor determination system according to the third example embodiment, the height above ground derivation unit 9 outputs derived height above ground information to the indoor/outdoor environment classification determination unit 4 and the data transmission unit 5. Next, the indoor/outdoor environment classification determination unit 4 receives the height above ground information from the height above ground derivation unit 9, determines environment classification of a position where the mobile terminal 1 exists, according to a predetermined operation, based on the received height above ground information and information (positional information, satellite elevation angle information, satellite azimuth angle information) from the GPS receiver 3, and outputs the resulting determination information to the data transmission unit 5. Note that the predetermined operation will be described later. The remaining operation is similar to that according to the example embodiment 2.

Figure 16:
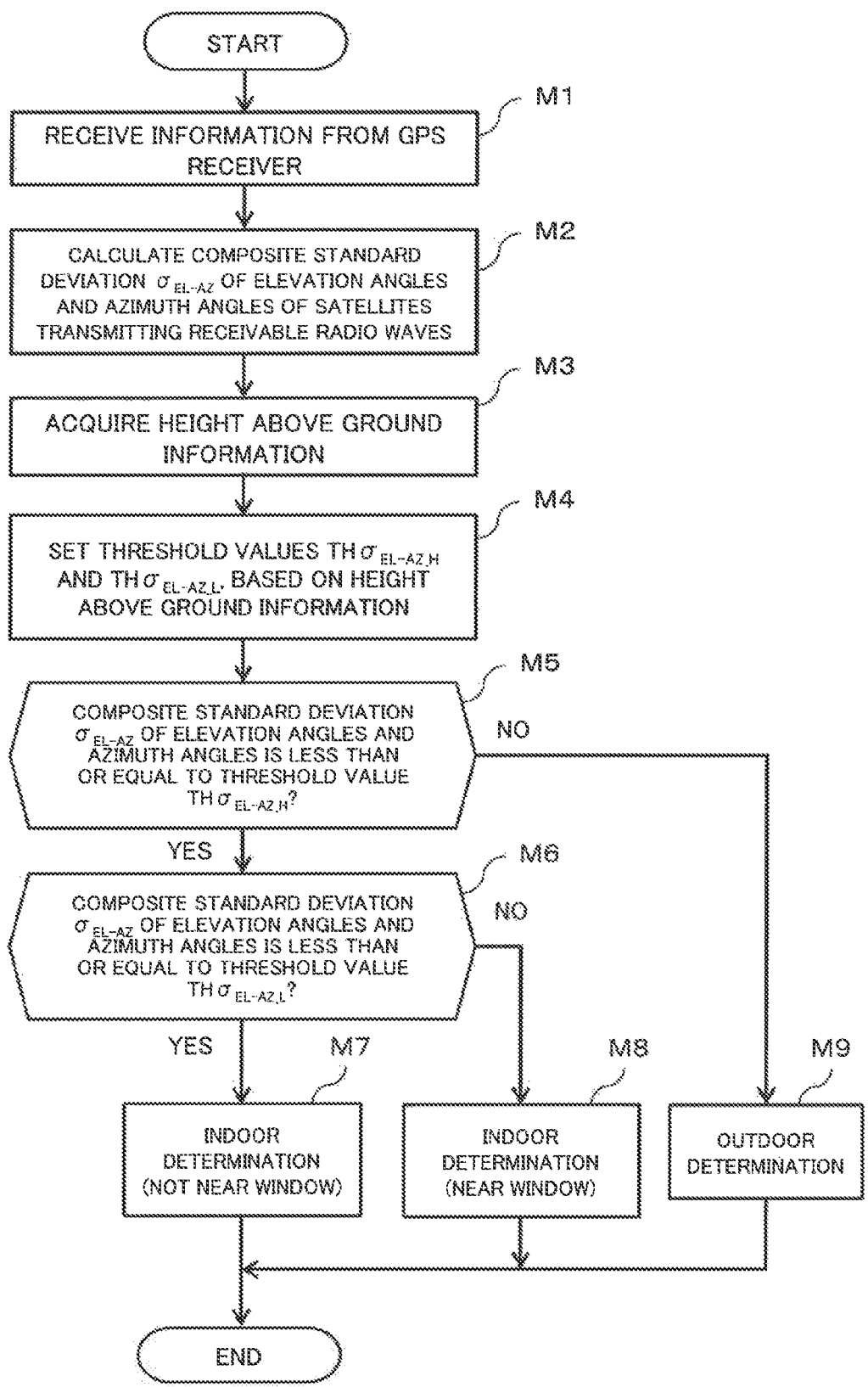
FIG. 16 is a flowchart schematically illustrating an operation of a mobile terminal in the indoor/outdoor determination system according to the third example embodiment.

Next, the predetermined operation will be described by use of a drawing. FIG. 16 is a flowchart schematically illustrating the operation of the mobile terminal in the indoor/outdoor determination system according to the third example embodiment. The operation sets threshold values $TH\sigma_{EL\text{-}AZ\_H}$ and $TH\sigma_{EL\text{-}AZ\_L}$ based on height above ground information when making an indoor/outdoor determination and a near-a-window/not-near-a-window determination in the indoor case, based on a composite standard deviation of elevation angles and azimuth angles of satellites. Additionally, see FIG. 15 for the components of the mobile terminal.

First, after going through Steps M1 and M2 identical to Steps H1 and H2 in FIG. 10, the indoor/outdoor environment classification determination unit 4 acquires height above ground information from the height above ground derivation unit 9 (Step M3).

Next, based on the acquired height above ground information, the indoor/outdoor environment classification determination unit 4 sets threshold values $TH\sigma_{EL\text{-}AZ\_H}$ (first composite standard deviation threshold value) and $TH\sigma_{EL\text{-}AZ\_L}$ (second composite standard deviation threshold value) (Step M4). Note that, in general, there is a tendency that a bias of an elevation angle distribution or a plane azimuth distribution of satellites transmitting receivable radio waves often widens at a location with a large height above ground. Accordingly, in Step M4, magnitude of the threshold values $TH\sigma_{EL\text{-}AZ}$ and $TH\sigma_{EL\text{-}AZ\_L}$ are set based on the acquired height above ground information. Further, it is assumed that $TH\sigma_{EL\text{-}AZ\_H}$ is greater than $TH\sigma_{EL\text{-}AZ\_L}$.

Next, the indoor/outdoor environment classification determination unit 4 assesses whether the calculated composite standard deviation $\sigma_{EL\text{-}AZ}$ of elevation angles and azimuth angles is less than or equal to the threshold value $TH\sigma_{EL\text{-}AZ\_H}$ (Step M5).

When the composite standard deviation $\sigma_{EL\text{-}AZ}$ of elevation angles and azimuth angles is less than or equal to the threshold value $TH\sigma_{EL\text{-}AZ\_H}$ (YES in Step M5), the indoor/outdoor environment classification determination unit 4 assesses whether the calculated composite standard deviation $\sigma_{EL\text{-}AZ}$ of elevation angles and azimuth angles is less than or equal to the preset threshold value $TH\sigma_{EL\text{-}AZ\_L}$ (Step M6).

When the composite standard deviation $\sigma_{EL\text{-}AZ}$ of elevation angles and azimuth angles is less than or equal to the threshold value $TH\sigma_{EL\text{-}AZ\_L}$ (YES in Step M6), the indoor/outdoor environment classification determination unit 4 determines that the mobile terminal 1 is positioned indoors (not near a window) (Step M7) and ends the operation.

When the composite standard deviation $\sigma_{EL\text{-}AZ}$ of elevation angles and azimuth angles is not less than or equal to the threshold value $TH\sigma_{EL\text{-}AZ\_L}$ (NO in Step M6), the indoor/outdoor environment classification determination unit 4 determines that the mobile terminal 1 is positioned indoors (near a window) (Step M8) and ends the operation.

When the composite standard deviation $\sigma_{EL\text{-}AZ}$ of elevation angles and azimuth angles is not less than or equal to the threshold value $TH\sigma_{EL\text{-}AZ\_H}$ (NO in Step M5), the indoor/outdoor environment classification determination unit 4 determines that the mobile terminal 1 is positioned outdoors (Step M9) and ends the operation.

The third example embodiment provides an effect of providing an indoor/outdoor determination with yet higher precision than the first example embodiment. The reason is that a suitable indoor/outdoor determination threshold value based on a height above ground can be determined by considering a tendency that surrounding buildings decrease, and an open sky and better visibility often become available at a location with a large height above ground, and therefore a bias of an elevation angle distribution or a plane azimuth distribution of satellites transmitting receivable radio waves widens.

Fourth Example Embodiment

Figure 17:
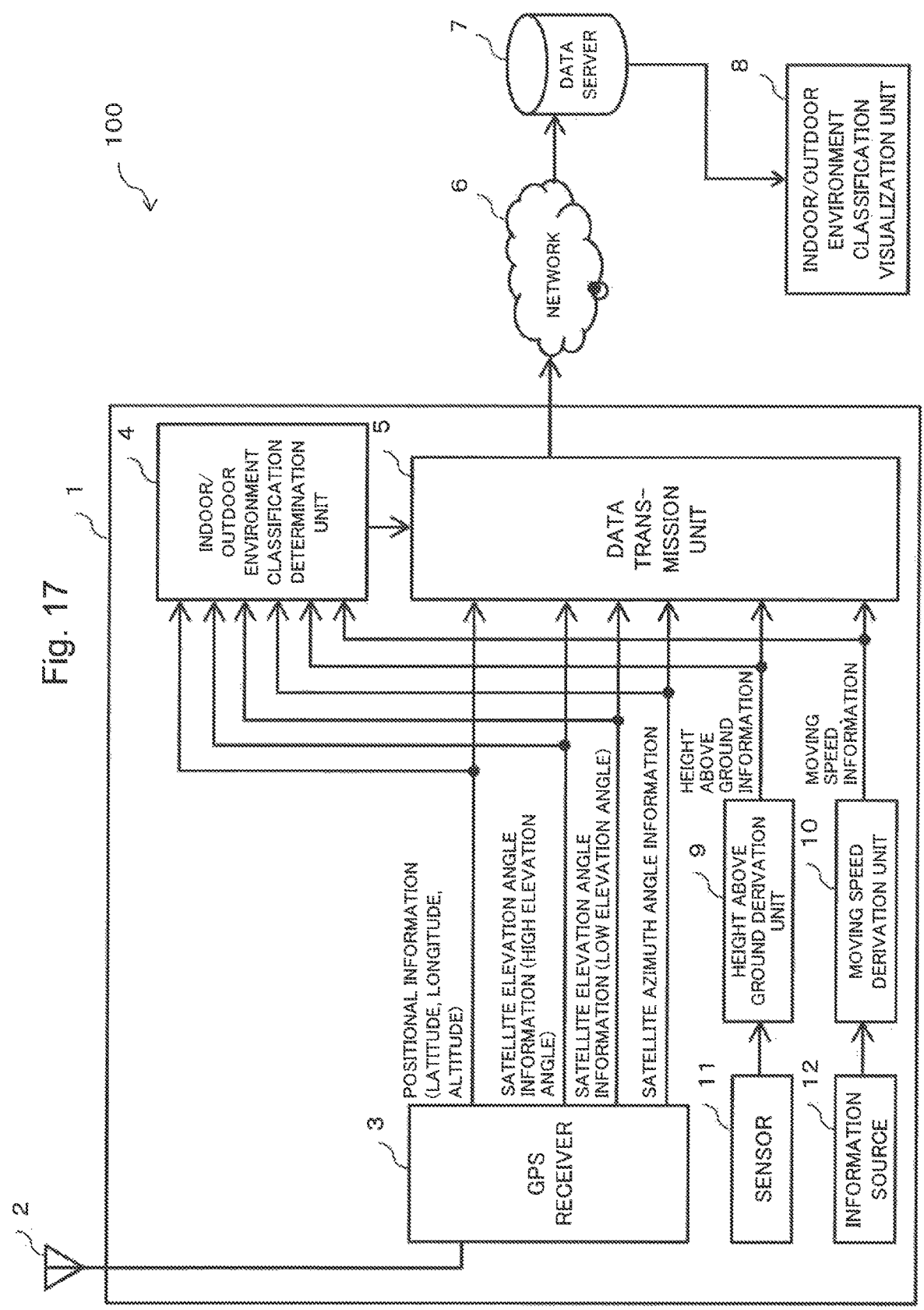
FIG. 17 is a block diagram schematically illustrating a configuration of an indoor/outdoor determination system according to a fourth example embodiment.

An indoor/outdoor determination system according to a fourth example embodiment will be described by use of drawings. FIG. 17 is a block diagram schematically illustrating a configuration of the indoor/outdoor determination system according to the fourth example embodiment.

The fourth example embodiment is a modified example of the third example embodiment (see FIG. 15) and makes an indoor/outdoor determination, a near-a-window/not-near-a-window determination in the indoor case, an inside-a-subway/not-inside-a-subway determination in the case of not-near-a-window, and an inside-a-ground-vehicle (e.g. a roofed train and an automobile)/not-inside-a-ground-vehicle determination in the case of near-a-window, based on information including moving speed information of a mobile terminal 1. The mobile terminal 1 includes a moving speed derivation unit 10 and an information source 12 as means of acquiring moving speed information.

The moving speed derivation unit 10 is a functional unit deriving moving speed information, based on information from the information source 12. The moving speed derivation unit 10 outputs the derived moving speed information to an indoor/outdoor environment classification determination unit 4 and a data transmission unit 5. The moving speed derivation unit 10 may be provided by a computer executing software or by an integrated circuit.

The information source 12 is a functional unit outputting information being a basis for deriving a moving speed in the moving speed derivation unit 10. For example, an acceleration sensor may be used as the information source 12. In that case, moving speed information can be calculated by time-integrating acceleration in a horizontal direction. Further, for example, the GPS receiver 3 may be used as the information source 12. In that case, a means of calculating a moving speed from a temporal difference as a positioning result by the GPS receiver 3 may be cited. Further, for example, a data reception unit may be used as the information source 12. In that case, the data reception unit may receive a plurality of cellular base station IDs (known locations) and calculate a moving speed from a temporal difference therebetween. Further, for example, a beacon sensor (sensor 11) may be used as the information source 12. In that case, pieces of beacon information may be received from a beacon installed at a predetermined location, and a moving speed can be calculated from a temporal difference therebetween. Further, the information source 12 may combine the information sources described above and calculate high-precision moving speed information.

The indoor/outdoor environment classification determination unit 4 has a function of determining indoor/outdoor environment classification, based on information including moving speed information. The data transmission unit 5 is able to transmit data including moving speed information. The remaining configuration is similar to that according to the example embodiment 3. Further, a determination technique using moving speed information such as the fourth example embodiment may be applied to the first or second example embodiment.

With regard to an operation of the mobile terminal 1 in the indoor/outdoor determination system according to the fourth example embodiment, the moving speed derivation unit 10 outputs derived moving speed information to the indoor/outdoor environment classification determination unit 4 and the data transmission unit 5. Next, the indoor/outdoor environment classification determination unit 4 receives the moving speed information from the moving speed derivation unit 10, determines environment classification of a position where the mobile terminal 1 exists, according to a predetermined operation, based on the received moving speed information, information (positional information, satellite elevation angle information, and satellite azimuth angle information) from the GPS receiver 3, and height above ground information from a height above ground derivation unit 9, and outputs the resulting determination information to the data transmission unit 5. Note that the predetermined operation will be described later. The remaining operation is similar to that according to the example embodiment 3.

Figure 18:
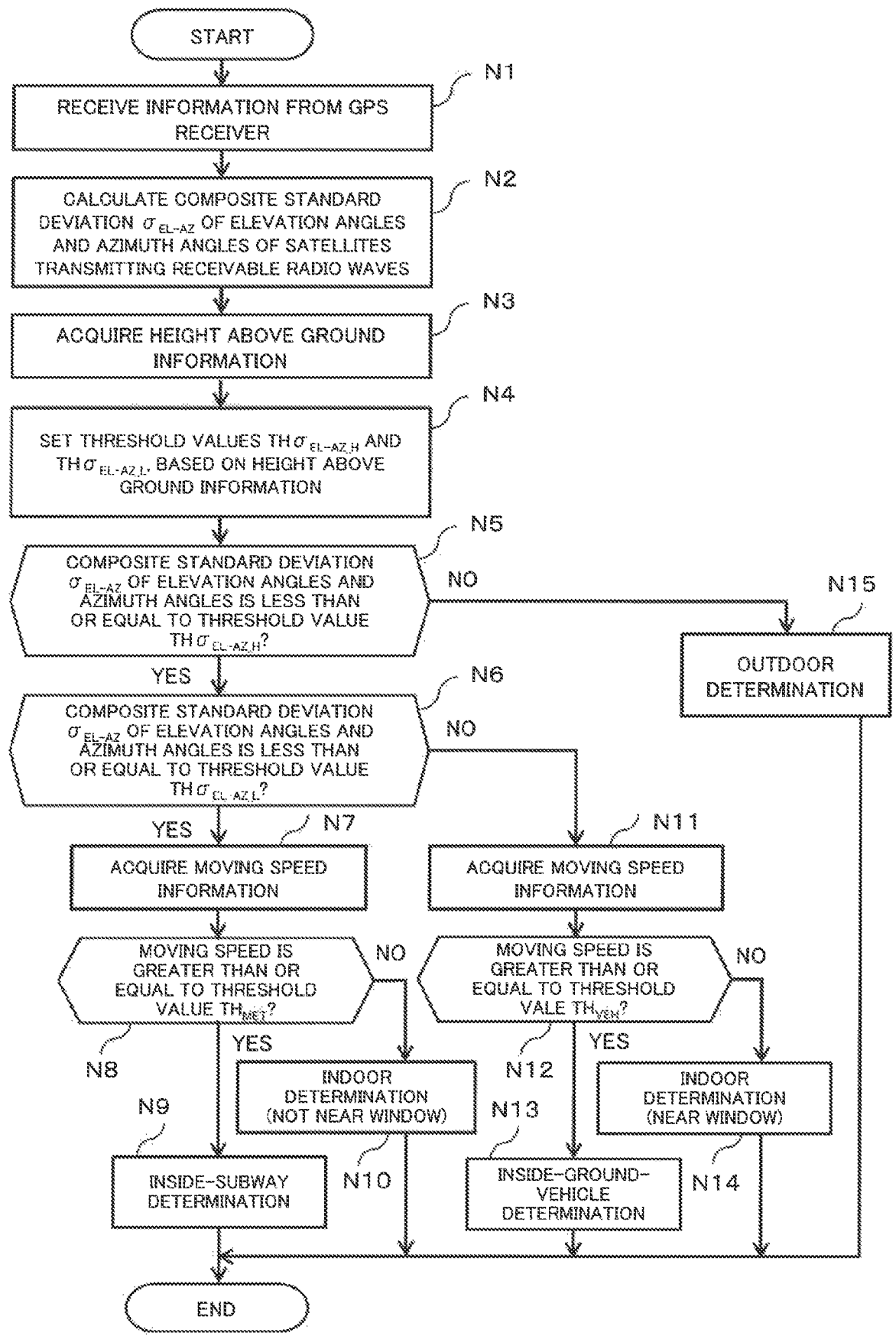
FIG. 18 is a flowchart schematically illustrating an operation of a mobile terminal in the indoor/outdoor determination system according to the fourth example embodiment.

Next, the predetermined operation will be described by use of a drawing. FIG. 18 is a flowchart schematically illustrating the operation of the mobile terminal in the indoor/outdoor determination system according to the fourth example embodiment. The operation makes an indoor/outdoor determination, a near-a-window/not-near-a-window determination in the indoor case, an inside-a-subway/not-inside-a-subway determination in the case of not-near-a-window, and an inside-a-ground-vehicle/not-inside ground-vehicle determination in the case of near-a-window, based on a composite standard deviation of elevation angles and azimuth angles of satellites. Additionally, see FIG. 17 for the components of the mobile terminal.

First, after going through Steps N1 to N6 identical to Steps M1 to M6 in FIG. 16, when the composite standard deviation $\sigma_{EL\text{-}AZ}$ of elevation angles and azimuth angles is less than or equal to the threshold value $TH\sigma_{EL\text{-}AZ\_L}$ (YES in Step N6), the indoor/outdoor environment classification determination unit 4 acquires moving speed information from the moving speed derivation unit 10 (Step N7).

Next, the indoor/outdoor environment classification determination unit 4 assesses whether or not a moving speed included in the acquired moving speed information is greater than or equal to a threshold value $TH_{MET}$ (first moving speed threshold value) (Step N8).

When the moving speed is greater than or equal to the threshold value $TH_{MET}$ (YES in Step N8), the indoor/outdoor environment classification determination unit 4 determines that the mobile terminal 1 is positioned indoors (not near a window) inside a subway (Step N9) and ends the operation.

When the moving speed is not greater than or equal to the threshold value $TH_{MET}$ (NO in Step N8), the indoor/outdoor environment classification determination unit 4 determines that the mobile terminal 1 is positioned indoors (not near a window) other than inside a subway (Step N10) and ends the operation.

When the composite standard deviation $\sigma_{EL-AZ}$ of elevation angles and azimuth angles is not less than or equal to the threshold value $TH\sigma_{EL-AZ\_L}$ (NO in Step N6), the indoor/outdoor environment classification determination unit 4 acquires moving speed information from the moving speed derivation unit 10 (Step N11).

Next, the indoor/outdoor environment classification determination unit 4 assesses whether or not a moving speed included in the acquired moving speed information is greater than or equal to a threshold value $TH_{VEH}$ (second moving speed threshold value) (Step N12). Note that the threshold value $TH_{VEH}$ may be identical to or different from the threshold value $TH_{MET}$.

When the moving speed is greater than or equal to the threshold value $TH_{VEH}$ (YES in Step N12), the indoor/outdoor environment classification determination unit 4 determines that the mobile terminal 1 is positioned indoors (near a window) inside a ground vehicle (Step N13) and ends the operation.

When the moving speed is not greater than or equal to the threshold value $TH_{VEH}$ (NO in Step N12), the indoor/outdoor environment classification determination unit 4 determines that the mobile terminal 1 is positioned indoors (near a window) other than inside a ground vehicle (Step N14) and ends the operation.

When the composite standard deviation $\sigma_{EL-AZ}$ of elevation angles and azimuth angles is not less than or equal to the threshold value $TH\sigma_{EL-AZ\_H}$ (NO in Step N5), the indoor/outdoor environment classification determination unit 4 determines that the mobile terminal 1 is positioned outdoors (Step N15) and ends the operation.

The fourth example embodiment is able to increase types of classification determinations being "inside a ground vehicle" and "inside a subway" in an indoor environment in addition to "not near a window indoors" and "near a window indoors" being determinations for locations of indoors according to the third example embodiment. Specifically, since inside a ground vehicle may also be classified as a moving indoor environment, by combining a bias of directions in which satellites transmitting receivable radio waves exist with moving speed information, an "inside-a-ground-vehicle" determination can be made by adding a determination based on the moving speed information to the result classified as "near a window indoors." Further, a case that a move is recognized in a nearly closed space where no satellites transmitting receivable radio waves exist may be considered as inside a subway, and therefore by applying a determination based on moving speed information to a result classified as "not near a window indoors," an "inside-a-subway" determination can be made.

Fifth Example Embodiment

Figure 19:
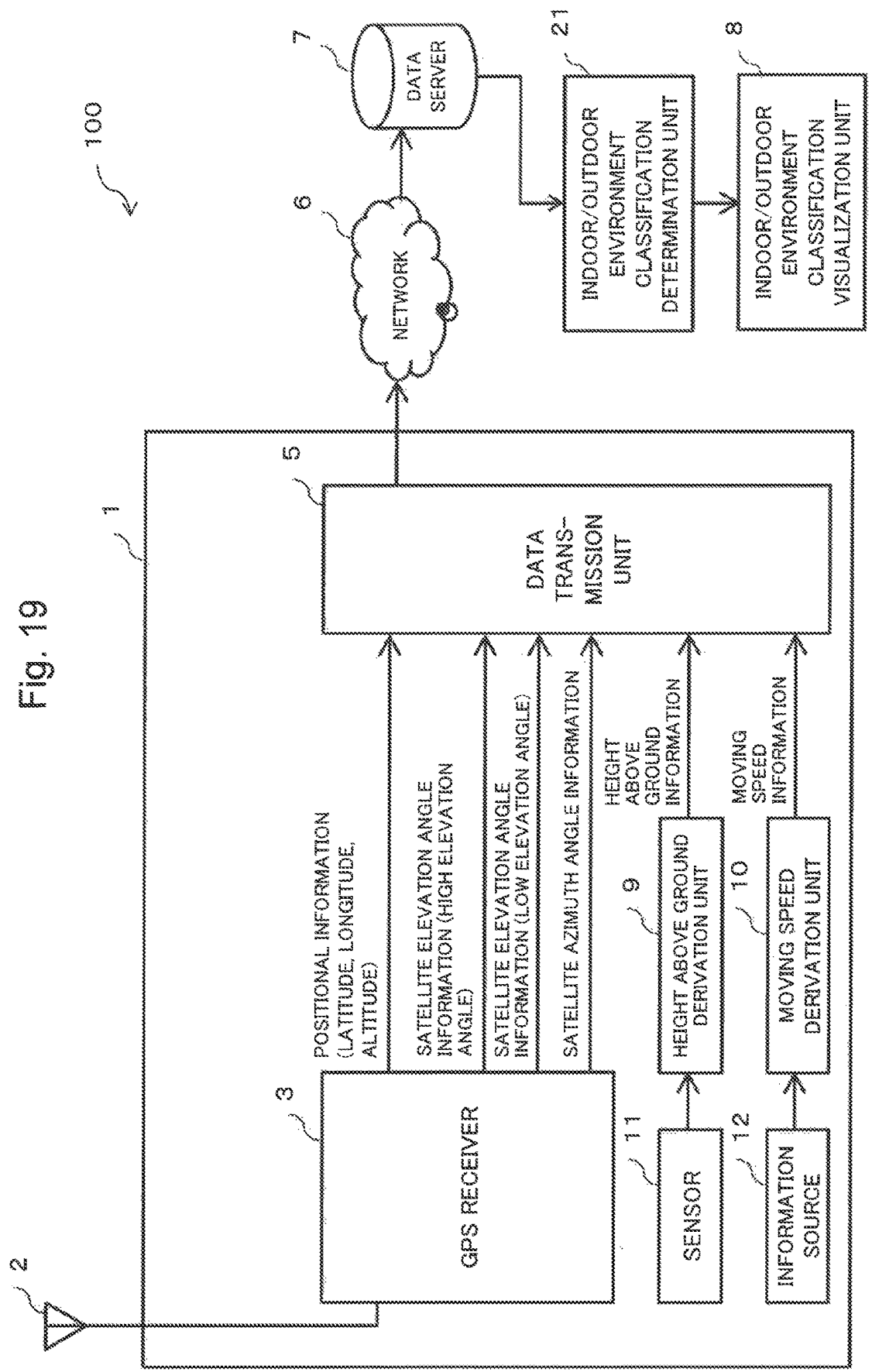
FIG. 19 is a block diagram schematically illustrating a configuration of an indoor/outdoor determination system according to a fifth example embodiment.

An indoor/outdoor determination system according to the fifth example embodiment will be described by use of a drawing. FIG. 19 is a block diagram schematically illustrating a configuration of the indoor/outdoor determination system according to the fifth example embodiment.

The fifth example embodiment is a modified example of the fourth example embodiment (see FIG. 17), and an indoor/outdoor environment classification determination unit 21 is arranged outside a mobile terminal 1 in place of the indoor/outdoor environment classification determination unit (4 in FIG. 17) inside the mobile terminal (1 in FIG. 17).

The mobile terminal 1 transmits data required for determination to a data server 7 through a network 6.

The data server 7 has a function of accumulating data from the mobile terminal 1 and transmitting a part of the accumulated data to the indoor/outdoor environment classification determination unit 21 in response to a request from the indoor/outdoor environment classification determination unit 21.

The indoor/outdoor environment classification determination unit is arranged between the data server 7 and an indoor/outdoor environment classification visualization unit 8. The indoor/outdoor environment classification determination unit 21 determines environment classification of a position where the mobile terminal 1 exists, according to a predetermined operation, and outputs the result to the indoor/outdoor environment classification visualization unit 8. The predetermined operation is similar to the predetermined operation according to the fourth example embodiment, and the predetermined operations according to the first to third example embodiments may be performed.

The remaining configuration is similar to that according to the fourth example embodiment. Further, the configuration of arranging the indoor/outdoor environment classification determination unit 21 between the data server 7 and the indoor/outdoor environment classification visualization unit 8 may be applied to the first to third example embodiments.

An operation according to the fifth example embodiment differs from the operation according to the fourth example embodiment only in that processing in the indoor/outdoor environment classification determination unit 21 is performed between processing in the data server 7 and processing in the indoor/outdoor environment classification visualization unit 8, and the remaining operations are identical.

The fifth example embodiment provides an effect that a processing load involved in indoor/outdoor determination on a mobile terminal can be reduced, and power consumption can be held down, compared with the fourth example embodiment. The reason is that an entity of the indoor/outdoor determination processing is provided outside the mobile terminal 1 instead of inside the mobile terminal 1, according to the fifth example embodiment. In general, while a central processing unit (CPU) on the mobile terminal 1 often exhibits low performance due to downsizing, the fifth example embodiment is significantly effective when performance of the mobile terminal 1 is low.

Sixth Example Embodiment

Figure 20:
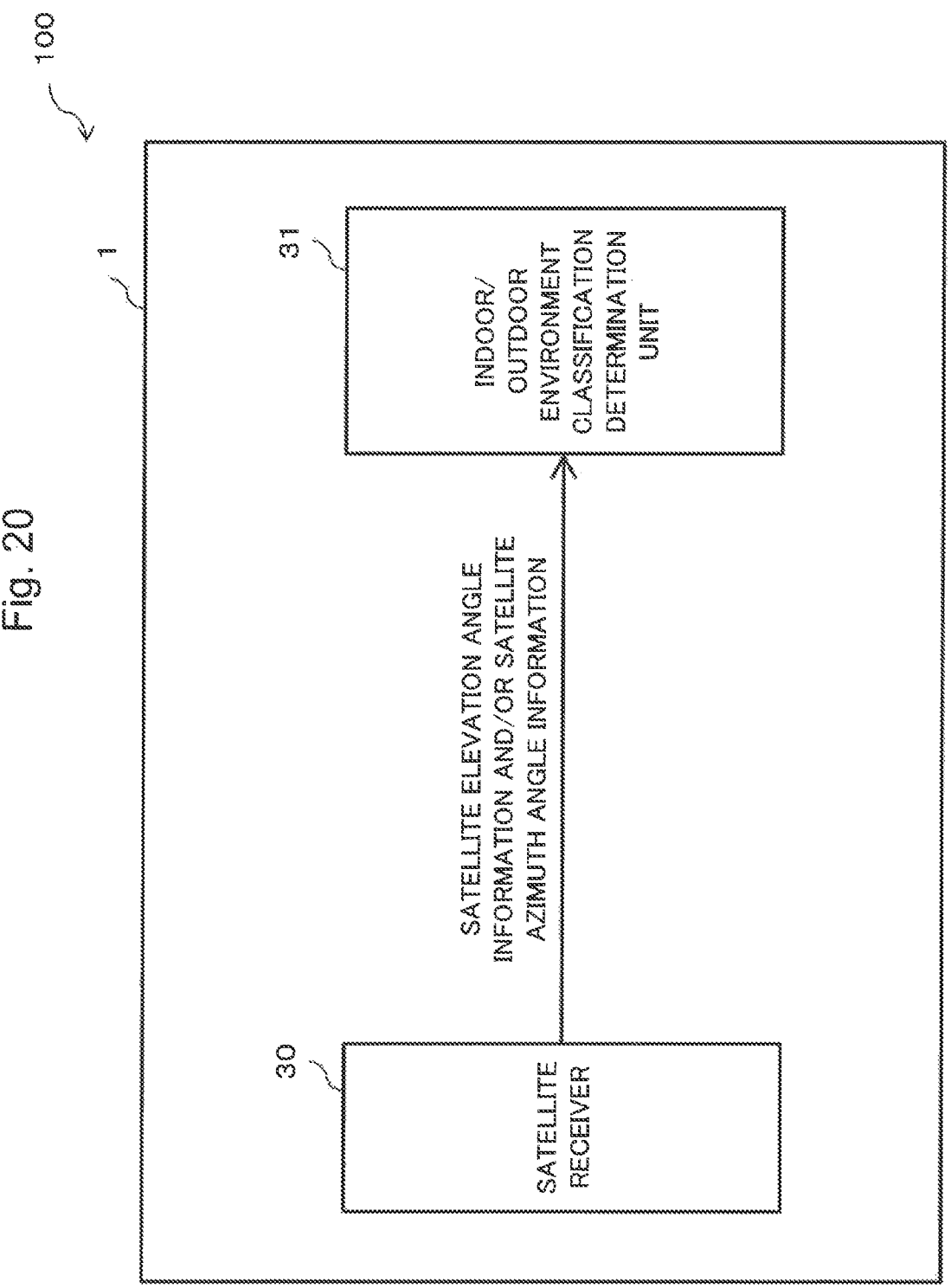
FIG. 20 is a block diagram schematically illustrating a configuration of an indoor/outdoor determination system according to a sixth example embodiment.
Figure 21:
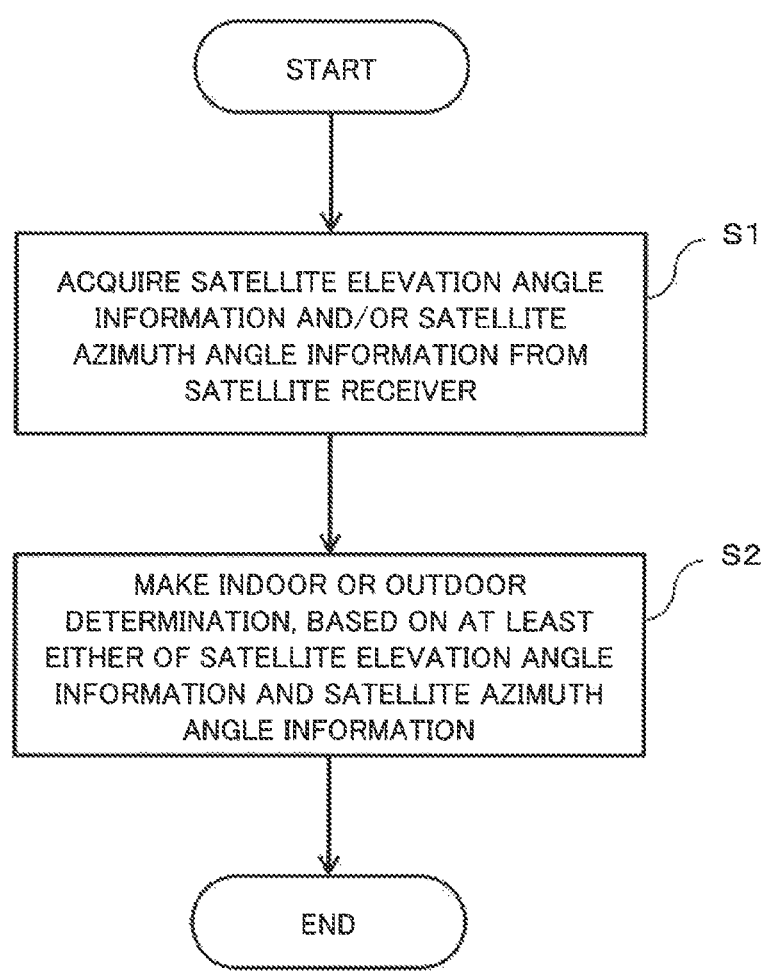
FIG. 21 is a flowchart schematically illustrating an operation of an indoor/outdoor environment classification determination unit in the indoor/outdoor determination system according to the sixth example embodiment.

An indoor/outdoor determination system according to a sixth example embodiment will be described by use of drawings. FIG. 20 is a block diagram schematically illustrating a configuration of the indoor/outdoor determination system according to the sixth example embodiment. FIG. 21 is a flowchart schematically illustrating an operation of an indoor/outdoor environment classification determination unit in the indoor/outdoor determination system according to the sixth example embodiment.

An indoor/outdoor determination system 100 is a system determining whether a mobile terminal 1 exists indoors or outdoors (see FIG. 20). The indoor/outdoor determination system 100 includes an indoor/outdoor environment classification determination unit 31. The indoor/outdoor environment classification determination unit 31 is a functional unit provided by executing an indoor/outdoor determination program determining, by use of a hardware resource, whether a mobile terminal exists indoors or outdoors. The indoor/outdoor environment classification determination unit 31 acquires at least either of satellite elevation angle information and satellite azimuth angle information directly or indirectly from a satellite receiver 30 provided in the mobile terminal 1 (Step S1 in FIG. 21). The indoor/outdoor environment classification determination unit 31 determines whether the mobile terminal 1 exists indoors or outdoors, based on at least either of the satellite elevation angle information and the satellite azimuth angle information (Step S2 in FIG. 21). Note that, while the indoor/outdoor environment classification determination unit 31 exists inside the mobile terminal 1 in FIG. 20, the unit may exist outside the mobile terminal 1.

The sixth example embodiment is able to provide an indoor/outdoor determination by making, as an indicator, a physical statistic representing a property that directions of satellites transmitting radio waves receivable in a building incline toward a low elevation angle, and therefore is able to make an indoor/outdoor determination with higher precision than a determination method based on a satellite reception strength, threshold value setting by the method being more difficult.

The whole or part of the example embodiments disclosed above can be described as, but not limited to, the following supplementary notes.

[Supplementary Notes]

The present invention is able to provide a mode of an indoor/outdoor determination program according to the first aspect.

The indoor/outdoor determination program, according to the first aspect, causes execution of: a step of counting a first satellite count existing in a first elevation angle range, based on the satellite elevation angle information; a step of counting a second satellite count existing in a second elevation angle range higher than the first elevation angle range, based on the satellite elevation angle information; a step of calculating a satellite count ratio between the first satellite count and the second satellite count; a step of making a determination for locations of indoors when the satellite count ratio is greater than or equal to a satellite count ratio threshold value which is preset; and a step of making an outdoor determination when the satellite count ratio is not greater than or equal to the satellite count ratio threshold value.

The indoor/outdoor determination program, according to the first aspect, causes execution of: a step of counting a first satellite count existing in a first elevation angle range, based on the satellite elevation angle information; a step of counting a second satellite count existing in a second elevation angle range higher than the first elevation angle range, based on the satellite elevation angle information; a step of calculating a satellite count ratio between the first satellite count and the second satellite count; a step of making an outdoor determination when the satellite count ratio is not greater than or equal to a first satellite count ratio threshold value which is preset; a step of assessing whether or not the satellite count ratio is greater than or equal to a second satellite count ratio threshold value greater than the first satellite count ratio threshold value when the satellite count ratio is greater than or equal to the first satellite count ratio threshold value; a step of making an indoor and not-near-a-window determination when the satellite count ratio is greater than or equal to the second satellite count ratio threshold value; and a step of making an indoor and near-a-window determination when the satellite count ratio is not greater than or equal to the second satellite count ratio threshold value.

The indoor/outdoor determination program, according to the first aspect, causes execution of: a step of calculating an average elevation angle, a maximum elevation angle, and an elevation angle standard deviation, based on the satellite elevation angle information; a step of making an outdoor determination when the average elevation angle is not less than or equal to an average elevation angle threshold value which is preset; a step of making an outdoor determination when the maximum elevation angle is not less than or equal to a maximum elevation angle threshold value which is preset; a step of making an outdoor determination when the elevation angle standard deviation is not less than or equal to an elevation angle standard deviation threshold value which is preset; and a step of making a determination for locations of indoors when the average elevation angle is less than or equal to the average elevation angle threshold value, the maximum elevation angle is less than or equal to the maximum elevation angle threshold value, and the elevation angle standard deviation is less than or equal to the elevation angle standard deviation threshold value.

The indoor/outdoor determination program, according to the first aspect, causes execution of: a step of calculating an average elevation angle, a maximum elevation angle, and an elevation angle standard deviation, based on the satellite elevation angle information; a step of making an outdoor determination when the average elevation angle is not less than or equal to an average elevation angle threshold value which is preset; a step of making an outdoor determination when the maximum elevation angle is not less than or equal to a maximum elevation angle threshold value which is preset; a step of making an outdoor determination when the elevation angle standard deviation is not less than or equal to a first elevation angle standard deviation threshold value which is preset; a step of, when the average elevation angle is less than or equal to the average elevation angle threshold value, the maximum elevation angle is less than or equal to the maximum elevation angle threshold value, and the elevation angle standard deviation is less than or equal to a first elevation angle standard deviation threshold value, assessing whether or not the elevation angle standard deviation is less than or equal to a second elevation angle standard deviation threshold value less than the first elevation angle standard deviation threshold value; a step of making an indoor and not-near-a-window determination when the elevation angle standard deviation is less than or equal to the second elevation angle standard deviation threshold value; and a step of making an indoor and near-a-window determination when the elevation angle standard deviation is not less than or equal to the second elevation angle standard deviation threshold value.

The indoor/outdoor determination program, according to the first aspect, causes execution of: a step of calculating an average elevation angle, a maximum elevation angle, and an elevation angle standard deviation, based on the satellite elevation angle information; a step of making an outdoor determination when the average elevation angle is not less than or equal to an average elevation angle threshold value which is preset; a step of making an outdoor determination when the maximum elevation angle is not less than or equal to a maximum elevation angle threshold value which is preset; a step of making an outdoor determination when the elevation angle standard deviation is not less than or equal to a first elevation angle standard deviation threshold value which is preset; a step of, when the average elevation angle is less than or equal to the average elevation angle threshold value, the maximum elevation angle is less than or equal to the maximum elevation angle threshold value, and the elevation angle standard deviation is less than or equal to a first elevation angle standard deviation threshold value, assessing whether or not the elevation angle standard deviation is less than or equal to a second elevation angle standard deviation threshold value less than the first elevation angle standard deviation threshold value; a step of making an indoor and near-a-window determination when the elevation angle standard deviation is not less than or equal to the second elevation angle standard deviation threshold value; a step of calculating an azimuth width of a satellite transmitting a receivable radio wave, based on the satellite azimuth angle information when the elevation angle standard deviation is less than or equal to the second elevation angle standard deviation threshold value; a step of making an indoor and not-near-a-window determination when the azimuth width is less than or equal to an azimuth width threshold value which is preset; and a step of making an indoor and near-a-window determination when the azimuth width is not less than or equal to the azimuth width threshold value.

The indoor/outdoor determination program, according to the first aspect, causes execution of: a step of calculating an average elevation angle, a maximum elevation angle, and an elevation angle standard deviation, based on the satellite elevation angle information; a step of making an outdoor determination when the average elevation angle is not less than or equal to an average elevation angle threshold value which is preset; a step of making an outdoor determination when the maximum elevation angle is not less than or equal to a maximum elevation angle threshold value which is preset; a step of making an outdoor determination when the elevation angle standard deviation is not less than or equal to a first elevation angle standard deviation threshold value which is preset; a step of assessing whether or not the elevation angle standard deviation is less than or equal to a second elevation angle standard deviation threshold value less than the first elevation angle standard deviation threshold value which is preset when the average elevation angle is less than or equal to the average elevation angle threshold value, the maximum elevation angle is less than or equal to the maximum elevation angle threshold value, and the elevation angle standard deviation is less than or equal to the first elevation angle standard deviation threshold value; a step of making an indoor and near-a-window determination when the elevation angle standard deviation is not less than or equal to the second elevation angle standard deviation threshold value; a step of calculating an azimuth angle standard deviation of a satellite transmitting a receivable radio wave, based on the satellite azimuth angle information, when the elevation angle standard deviation is less than or equal to the second elevation angle standard deviation threshold value; a step of making an indoor and not-near-a-window determination when the azimuth angle standard deviation is less than or equal to an azimuth angle standard deviation threshold value which is preset; and a step of making an indoor and near-a-window determination when the azimuth angle standard deviation is not less than or equal to the azimuth angle standard deviation threshold value.

The indoor/outdoor determination program, according to the first aspect, causes execution of: a step of calculating a composite standard deviation of an elevation angle and an azimuth angle of a satellite transmitting a receivable radio wave, based on the satellite elevation angle information and the satellite azimuth angle information; a step of making a determination for locations of indoors when the composite standard deviation is less than or equal to a composite standard deviation threshold value which is preset; and a step of making an outdoor determination when the composite standard deviation is not less than or equal to the composite standard deviation threshold value.

The indoor/outdoor determination program, according to the first aspect, causes execution of: a step of calculating a composite standard deviation of an elevation angle and an azimuth angle of a satellite transmitting a receivable radio wave, based on the satellite elevation angle information and the satellite azimuth angle information; a step of making an outdoor determination when the composite standard deviation is not less than or equal to a first composite standard deviation threshold value which is preset; a step of assessing whether or not the composite standard deviation is less than or equal to a second composite standard deviation threshold value less than the first composite standard deviation threshold value when the composite standard deviation is less than or equal to the first composite standard deviation threshold value; a step of making an indoor and not-near-a-window determination when the composite standard deviation is less than or equal to the second composite standard deviation threshold value; and a step of making an indoor and near-a-window determination when the composite standard deviation is not less than or equal to the second composite standard deviation threshold value.

The indoor/outdoor determination program, according to the first aspect, causes execution of: a step of calculating a 3D azimuth area of a satellite transmitting a receivable radio wave, based on the satellite elevation angle information and the satellite azimuth angle information; a step of making a determination for locations of indoors when the 3D azimuth area is less than or equal to a 3D azimuth area threshold value which is preset; and a step of making an outdoor determination when the 3D azimuth area is not less than or equal to the 3D azimuth area threshold value.

The indoor/outdoor determination program, according to the first aspect, causes execution of: a step of calculating a degree of bias of a satellite transmitting a receivable radio wave, toward a predetermined elevation angle and a specific direction, based on the satellite elevation angle information and the satellite azimuth angle information; a step of making a determination for locations of indoors when the degree of bias is less than or equal to a degree of bias threshold value which is preset; and a step of making an outdoor determination when the degree of bias is not less than or equal to the degree of bias threshold value.

The indoor/outdoor determination program, according to the first aspect, causes execution of: a step of calculating a composite standard deviation of an elevation angle and an azimuth angle of a satellite transmitting a receivable radio wave, based on the satellite elevation angle information and the satellite azimuth angle information; a step of setting a first standard deviation threshold value and a second standard deviation threshold value less than the first standard deviation threshold value, based on height above ground information directly or indirectly acquired from height above ground derivation means provided in the mobile terminal; a step of making an outdoor determination when the composite standard deviation is not less than or equal to the first composite standard deviation threshold value; a step of assessing whether or not the composite standard deviation is less than or equal to a second composite standard deviation threshold value less than the first composite standard deviation threshold value when the composite standard deviation is less than or equal to the first composite standard deviation threshold value; a step of making an indoor and not-near-a-window determination when the composite standard deviation is less than or equal to the second composite standard deviation threshold value; and a step of making an indoor and near-a-window determination when the composite standard deviation is not less than or equal to the second composite standard deviation threshold value.

The indoor/outdoor determination program, according to the first aspect, causes execution of: a step of calculating a composite standard deviation of an elevation angle and an azimuth angle of a satellite transmitting a receivable radio wave, based on the satellite elevation angle information and the satellite azimuth angle information; a step of setting a first standard deviation threshold value and a second standard deviation threshold value less than the first standard deviation threshold value, based on height above ground information directly or indirectly acquired from height above ground derivation means provided in the mobile terminal; a step of making an outdoor determination when the composite standard deviation is not less than or equal to the first composite standard deviation threshold value; a step of assessing whether or not the composite standard deviation is less than or equal to a second composite standard deviation threshold value less than the first composite standard deviation threshold value when the composite standard deviation is less than or equal to the first composite standard deviation threshold value; a step of assessing whether or not moving speed information directly or indirectly acquired from moving speed derivation means provided in the mobile terminal is greater than or equal to a first moving speed threshold value which is preset when the composite standard deviation is less than or equal to the second composite standard deviation threshold value; a step of making an inside-a-subway determination when the moving speed information is greater than or equal to the first moving speed threshold value; a step of making an indoor and not-near-a-window determination when the moving speed information is not greater than or equal to the first moving speed threshold value; a step of assessing whether or not moving speed information directly or indirectly acquired from the moving speed derivation means is greater than or equal to a second moving speed threshold value which is preset when the composite standard deviation is less than or equal to the second composite standard deviation threshold value; a step of making an inside-a-ground-vehicle determination when the moving speed information is greater than or equal to the second moving speed threshold value; and a step of making an indoor and near-a-window determination when the moving speed information is not greater than or equal to the second moving speed threshold value.

The present invention is able to provide a mode of an indoor/outdoor determination system according to the second aspect.

The present invention is able to provide a mode of an indoor/outdoor determination system according to the third aspect.

A mobile terminal in the indoor/outdoor determination system, according to the third aspect, includes a sensor and a height above ground derivation unit deriving a height above ground by use of information detected by the sensor.

The mobile terminal in the indoor/outdoor determination system, according to the third aspect, includes an information source and a moving speed derivation unit deriving moving speed information, based on information from the information source.

The present invention is able to provide a mode of an indoor/outdoor determination method according to the fourth aspect.

The indoor/outdoor determination method, according to the forth aspect, includes: counting a first satellite count existing in a first elevation angle range, based on the satellite elevation angle information; counting a second satellite count existing in a second elevation angle range higher than the first elevation angle range, based on the satellite elevation angle information; calculating a satellite count ratio between the first satellite count and the second satellite count; making a determination for locations of indoors when the satellite count ratio is greater than or equal to a satellite count ratio threshold value which is preset; and making an outdoor determination when the satellite count ratio is not greater than or equal to the satellite count ratio threshold value.

The indoor/outdoor determination method, according to the forth aspect, includes: counting a first satellite count existing in a first elevation angle range, based on the satellite elevation angle information; counting a second satellite count existing in a second elevation angle range higher than the first elevation angle range, based on the satellite elevation angle information; calculating a satellite count ratio between the first satellite count and the second satellite count; making an outdoor determination when the satellite count ratio is not greater than or equal to a first satellite count ratio threshold value which is preset; assessing whether or not the satellite count ratio is greater than or equal to a second satellite count ratio threshold value greater than the first satellite count ratio threshold value when the satellite count ratio is greater than or equal to the first satellite count ratio threshold value; making an indoor and not-near-a-window determination when the satellite count ratio is greater than or equal to the second satellite count ratio threshold value; and making an indoor and near-a-window determination when the satellite count ratio is not greater than or equal to the second satellite count ratio threshold value.

The indoor/outdoor determination method, according to the forth aspect, includes: calculating an average elevation angle, a maximum elevation angle, and an elevation angle standard deviation, based on the satellite elevation angle information; making an outdoor determination when the average elevation angle is not less than or equal to an average elevation angle threshold value which is preset; making an outdoor determination when the maximum elevation angle is not less than or equal to a maximum elevation angle threshold value which is preset; making an outdoor determination when the elevation angle standard deviation is not less than or equal to an elevation angle standard deviation threshold value which is preset; and making a determination for locations of indoors when the average elevation angle is less than or equal to the average elevation angle threshold value, the maximum elevation angle is less than or equal to the maximum elevation angle threshold value, and the elevation angle standard deviation is less than or equal to the elevation angle standard deviation threshold value.

The indoor/outdoor determination method, according to the forth aspect, includes: calculating an average elevation angle, a maximum elevation angle, and an elevation angle standard deviation, based on the satellite elevation angle information; making an outdoor determination when the average elevation angle is not less than or equal to an average elevation angle threshold value which is preset; making an outdoor determination when the maximum elevation angle is not less than or equal to a maximum elevation angle threshold value which is preset; making an outdoor determination when the elevation angle standard deviation is not less than or equal to a first elevation angle standard deviation threshold value which is preset; when the average elevation angle is less than or equal to the average elevation angle threshold value, the maximum elevation angle is less than or equal to the maximum elevation angle threshold value, and the elevation angle standard deviation is less than or equal to a first elevation angle standard deviation threshold value, assessing whether or not the elevation angle standard deviation is less than or equal to a second elevation angle standard deviation threshold value less than the first elevation angle standard deviation threshold value; making an indoor and not-near-a-window determination when the elevation angle standard deviation is less than or equal to the second elevation angle standard deviation threshold value; and making an indoor and near-a-window determination when the elevation angle standard deviation is not less than or equal to the second elevation angle standard deviation threshold value.

The indoor/outdoor determination method, according to the forth aspect, includes: calculating an average elevation angle, a maximum elevation angle, and an elevation angle standard deviation, based on the satellite elevation angle information; making an outdoor determination when the average elevation angle is not less than or equal to an average elevation angle threshold value which is preset; making an outdoor determination when the maximum elevation angle is not less than or equal to a maximum elevation angle threshold value which is preset; making an outdoor determination when the elevation angle standard deviation is not less than or equal to a first elevation angle standard deviation threshold value which is preset; when the average elevation angle is less than or equal to the average elevation angle threshold value, the maximum elevation angle is less than or equal to the maximum elevation angle threshold value, and the elevation angle standard deviation is less than or equal to a first elevation angle standard deviation threshold value, assessing whether or not the elevation angle standard deviation is less than or equal to a second elevation angle standard deviation threshold value less than the first elevation angle standard deviation threshold value; making an indoor and near-a-window determination when the elevation angle standard deviation is not less than or equal to the second elevation angle standard deviation threshold value; calculating an azimuth width of a satellite transmitting a receivable radio wave, based on the satellite azimuth angle information, when the elevation angle standard deviation is less than or equal to the second elevation angle standard deviation threshold value; making an indoor and not-near-a-window determination when the azimuth width is less than or equal to an azimuth width threshold value which is preset; and making an indoor and near-a-window determination when the azimuth width is not less than or equal to the azimuth width threshold value.

The indoor/outdoor determination method, according to the forth aspect, includes: calculating an average elevation angle, a maximum elevation angle, and an elevation angle standard deviation, based on the satellite elevation angle information; making an outdoor determination when the average elevation angle is not less than or equal to an average elevation angle threshold value which is preset; making an outdoor determination when the maximum elevation angle is not less than or equal to a maximum elevation angle threshold value which is preset; making an outdoor determination when the elevation angle standard deviation is not less than or equal to a first elevation angle standard deviation threshold value which is preset; when the average elevation angle is less than or equal to the average elevation angle threshold value, the maximum elevation angle is less than or equal to the maximum elevation angle threshold value, and the elevation angle standard deviation is less than or equal to the first elevation angle standard deviation threshold value, assessing whether or not the elevation angle standard deviation is less than or equal to a second elevation angle standard deviation threshold value less than the first elevation angle standard deviation threshold value; making an indoor and near-a-window determination when the elevation angle standard deviation is not less than or equal to the second elevation angle standard deviation threshold value; calculating an azimuth angle standard deviation of a satellite transmitting a receivable radio wave, based on the satellite azimuth angle information, when the elevation angle standard deviation is less than or equal to the second elevation angle standard deviation threshold value; making an indoor and not-near-a-window determination when the azimuth angle standard deviation is less than or equal to an azimuth angle standard deviation threshold value which is preset; and making an indoor and near-a-window determination when the azimuth angle standard deviation is not less than or equal to the azimuth angle standard deviation threshold value.

The indoor/outdoor determination method, according to the forth aspect, includes: calculating a composite standard deviation of an elevation angle and an azimuth angle of a satellite transmitting a receivable radio wave, based on the satellite elevation angle information and the satellite azimuth angle information; making a determination for locations of indoors when the composite standard deviation is less than or equal to a composite standard deviation threshold value which is preset; and making an outdoor determination when the composite standard deviation is not less than or equal to the composite standard deviation threshold value.

The indoor/outdoor determination method, according to the forth aspect, includes: calculating a composite standard deviation of an elevation angle and an azimuth angle of a satellite transmitting a receivable radio wave, based on the satellite elevation angle information and the satellite azimuth angle information; making an outdoor determination when the composite standard deviation is not less than or equal to a first composite standard deviation threshold value which is preset; assessing whether or not the composite standard deviation is less than or equal to a second composite standard deviation threshold value less than the first composite standard deviation threshold value when the composite standard deviation is less than or equal to the first composite standard deviation threshold value; making an indoor and not-near-a-window determination when the composite standard deviation is less than or equal to the second composite standard deviation threshold value; and making an indoor and near-a-window determination when the composite standard deviation is not less than or equal to the second composite standard deviation threshold value.

The indoor/outdoor determination method, according to the forth aspect, includes: calculating a 3D azimuth area of a satellite transmitting a receivable radio wave, based on the satellite elevation angle information and the satellite azimuth angle information; making a determination for locations of indoors when the 3D azimuth area is less than or equal to a 3D azimuth area threshold value which is preset; and making an outdoor determination when the 3D azimuth area is not less than or equal to the 3D azimuth area threshold value.

The indoor/outdoor determination method, according to the forth aspect, includes: calculating a degree of bias of a satellite transmitting a receivable radio wave, toward a predetermined elevation angle and a specific direction, based on the satellite elevation angle information and the satellite azimuth angle information; making a determination for locations of indoors when the degree of bias is less than or equal to a degree of bias threshold value which is preset; and making an outdoor determination when the degree of bias is not less than or equal to the degree of bias threshold value.

The indoor/outdoor determination method, according to the forth aspect, includes: calculating a composite standard deviation of an elevation angle and an azimuth angle of a satellite transmitting a receivable radio wave, based on the satellite elevation angle information and the satellite azimuth angle information; setting a first standard deviation threshold value and a second standard deviation threshold value less than the first standard deviation threshold value, based on height above ground information directly or indirectly acquired from height above ground derivation means provided in the mobile terminal; making an outdoor determination when the composite standard deviation is not less than or equal to the first composite standard deviation threshold value; assessing whether or not the composite standard deviation is less than or equal to a second composite standard deviation threshold value less than the first composite standard deviation threshold value when the composite standard deviation is less than or equal to the first composite standard deviation threshold value; making an indoor and not-near-a-window determination when the composite standard deviation is less than or equal to the second composite standard deviation threshold value; and making an indoor and near-a-window determination when the composite standard deviation is not less than or equal to the second composite standard deviation threshold value.

The indoor/outdoor determination method, according to the forth aspect, includes: calculating a composite standard deviation of an elevation angle and an azimuth angle of a satellite transmitting a receivable radio wave, based on the satellite elevation angle information and the satellite azimuth angle information; setting a first standard deviation threshold value and a second standard deviation threshold value less than the first standard deviation threshold value, based on height above ground information directly or indirectly acquired from height above ground derivation means provided in the mobile terminal; making an outdoor determination when the composite standard deviation is not less than or equal to the first composite standard deviation threshold value; assessing whether or not the composite standard deviation is less than or equal to a second composite standard deviation threshold value less than the first composite standard deviation threshold value, when the composite standard deviation is less than or equal to the first composite standard deviation threshold value; assessing whether or not moving speed information directly or indirectly acquired from moving speed derivation means provided in the mobile terminal is greater than or equal to a first moving speed threshold value which is preset when the composite standard deviation is less than or equal to the second composite standard deviation threshold value; making an inside-a-subway determination when the moving speed information is greater than or equal to the first moving speed threshold value; making an indoor and not-near-a-window determination when the moving speed information is not greater than or equal to the first moving speed threshold value; assessing whether or not moving speed information directly or indirectly acquired from the moving speed derivation means is greater than or equal to a second moving speed threshold value which is preset when the composite standard deviation is less than or equal to the second composite standard deviation threshold value; making an inside-a-ground-vehicle determination when the moving speed information is greater than or equal to the second moving speed threshold value; and making an indoor and near-a-window determination when the moving speed information is not greater than or equal to the second moving speed threshold value.

The present invention is able to provide a mode of a mobile terminal according to the fifth aspect.

The mobile terminal, according to the fifth aspect, includes a sensor and a height above ground derivation unit for deriving a height above ground by use of information detected by the sensor.

The mobile terminal, according to the fifth aspect, includes an information source and a moving speed derivation unit for deriving moving speed information, based on information from the information source.

The present invention is able to provide a mode of an indoor/outdoor environment classification determination unit according to the sixth aspect.

The indoor/outdoor environment classification determination unit, according to the sixth aspect, counts a first satellite count existing in a first elevation angle range, based on the satellite elevation angle information and also counts a second satellite count existing in a second elevation angle range higher than the first elevation angle range, based on the satellite elevation angle information, calculates a satellite count ratio between the first satellite count and the second satellite count, makes a determination for locations of indoors when the satellite count ratio is greater than or equal to a satellite count ratio threshold value which is preset, and makes an outdoor determination when the satellite count ratio is not greater than or equal to the satellite count ratio threshold value.

The indoor/outdoor environment classification determination unit, according to the sixth aspect, counts a first satellite count existing in a first elevation angle range, based on the satellite elevation angle information; counts a second satellite count existing in a second elevation angle range higher than the first elevation angle range, based on the satellite elevation angle information; calculates a satellite count ratio between the first satellite count and the second satellite count; makes an outdoor determination when the satellite count ratio is not greater than or equal to a first satellite count ratio threshold value which is preset; assesses whether or not the satellite count ratio is greater than or equal to a second satellite count ratio threshold value greater than the first satellite count ratio threshold value when the satellite count ratio is greater than or equal to the first satellite count ratio threshold value; makes an indoor and not-near-a-window determination when the satellite count ratio is greater than or equal to the second satellite count ratio threshold value; and makes an indoor and near-a-window determination when the satellite count ratio is not greater than or equal to the second satellite count ratio threshold value.

The indoor/outdoor environment classification determination unit, according to the sixth aspect, calculates an average elevation angle, a maximum elevation angle, and an elevation angle standard deviation, based on the satellite elevation angle information; makes an outdoor determination when the average elevation angle is not less than or equal to an average elevation angle threshold value which is preset; makes an outdoor determination when the maximum elevation angle is not less than or equal to a maximum elevation angle threshold value which is preset; makes an outdoor determination when the elevation angle standard deviation is not less than or equal to an elevation angle standard deviation threshold value which is preset; and makes a determination for locations of indoors when the average elevation angle is less than or equal to the average elevation angle threshold value, the maximum elevation angle is less than or equal to the maximum elevation angle threshold value, and the elevation angle standard deviation is less than or equal to the elevation angle standard deviation threshold value.

The indoor/outdoor environment classification determination unit, according to the sixth aspect, calculates an average elevation angle, a maximum elevation angle, and an elevation angle standard deviation, based on the satellite elevation angle information; makes an outdoor determination when the average elevation angle is not less than or equal to an average elevation angle threshold value which is preset; makes an outdoor determination when the maximum elevation angle is not less than or equal to a maximum elevation angle threshold value which is preset; makes an outdoor determination when the elevation angle standard deviation is not less than or equal to a first elevation angle standard deviation threshold value which is preset; when the average elevation angle is less than or equal to the average elevation angle threshold value, the maximum elevation angle is less than or equal to the maximum elevation angle threshold value, and the elevation angle standard deviation is less than or equal to a first elevation angle standard deviation threshold value, assesses whether or not the elevation angle standard deviation is less than or equal to a second elevation angle standard deviation threshold value less than the first elevation angle standard deviation threshold value; makes an indoor and not-near-a-window determination when the elevation angle standard deviation is less than or equal to the second elevation angle standard deviation threshold value; and makes an indoor and near-a-window determination when the elevation angle standard deviation is not less than or equal to the second elevation angle standard deviation threshold value.

The indoor/outdoor environment classification determination unit, according to the sixth aspect, calculates an average elevation angle, a maximum elevation angle, and an elevation angle standard deviation, based on the satellite elevation angle information; makes an outdoor determination when the average elevation angle is not less than or equal to an average elevation angle threshold value which is preset; makes an outdoor determination when the maximum elevation angle is not less than or equal to a maximum elevation angle threshold value which is preset; makes an outdoor determination when the elevation angle standard deviation is not less than or equal to a first elevation angle standard deviation threshold value which is preset; when the average elevation angle is less than or equal to the average elevation angle threshold value, the maximum elevation angle is less than or equal to the maximum elevation angle threshold value, and the elevation angle standard deviation is less than or equal to a first elevation angle standard deviation threshold value, assesses whether or not the elevation angle standard deviation is less than or equal to a second elevation angle standard deviation threshold value less than the first elevation angle standard deviation threshold value; makes an indoor and near-a-window determination when the elevation angle standard deviation is not less than or equal to the second elevation angle standard deviation threshold value; calculates an azimuth width of a satellite transmitting a receivable radio wave, based on the satellite azimuth angle information, when the elevation angle standard deviation is less than or equal to the second elevation angle standard deviation threshold value; makes an indoor and not-near-a-window determination when the azimuth width is less than or equal to an azimuth width threshold value which is preset; and makes an indoor and near-a-window determination when the azimuth width is not less than or equal to the azimuth width threshold value.

The indoor/outdoor environment classification determination unit, according to the sixth aspect, calculates an average elevation angle, a maximum elevation angle, and an elevation angle standard deviation, based on the satellite elevation angle information; makes an outdoor determination when the average elevation angle is not less than or equal to an average elevation angle threshold value which is preset; makes an outdoor determination when the maximum elevation angle is not less than or equal to a maximum elevation angle threshold value which is preset; makes an outdoor determination when the elevation angle standard deviation is not less than or equal to a first elevation angle standard deviation threshold value which is preset; when the average elevation angle is less than or equal to the average elevation angle threshold value, the maximum elevation angle is less than or equal to the maximum elevation angle threshold value, and the elevation angle standard deviation is less than or equal to the first elevation angle standard deviation threshold value, assesses whether or not the elevation angle standard deviation is less than or equal to a second elevation angle standard deviation threshold value less than the first elevation angle standard deviation threshold value; makes an indoor and near-a-window determination when the elevation angle standard deviation is not less than or equal to the second elevation angle standard deviation threshold value; calculates an azimuth angle standard deviation of a satellite transmitting a receivable radio wave, based on the satellite azimuth angle information, when the elevation angle standard deviation is less than or equal to the second elevation angle standard deviation threshold value; makes an indoor and not-near-a-window determination when the azimuth angle standard deviation is less than or equal to an azimuth angle standard deviation threshold value which is preset; and makes an indoor and near-a-window determination when the azimuth angle standard deviation is not less than or equal to the azimuth angle standard deviation threshold value.

The indoor/outdoor environment classification determination unit, according to the sixth aspect, calculates a composite standard deviation of an elevation angle and an azimuth angle of a satellite transmitting a receivable radio wave, based on the satellite elevation angle information and the satellite azimuth angle information; makes a determination for locations of indoors when the composite standard deviation is less than or equal to a composite standard deviation threshold value which is preset; and makes an outdoor determination when the composite standard deviation is not less than or equal to the composite standard deviation threshold value.

The indoor/outdoor environment classification determination unit, according to the sixth aspect, calculates a composite standard deviation of an elevation angle and an azimuth angle of a satellite transmitting a receivable radio wave, based on the satellite elevation angle information and the satellite azimuth angle information; makes an outdoor determination when the composite standard deviation is not less than or equal to a first composite standard deviation threshold value which is preset; assesses whether or not the composite standard deviation is less than or equal to a second composite standard deviation threshold value less than the first composite standard deviation threshold value when the composite standard deviation is less than or equal to the first composite standard deviation threshold value; makes an indoor and not-near-a-window determination when the composite standard deviation is less than or equal to the second composite standard deviation threshold value; and making an indoor and near-a-window determination when the composite standard deviation is not less than or equal to the second composite standard deviation threshold value.

The indoor/outdoor environment classification determination unit, according to the sixth aspect, calculates a 3D azimuth area of a satellite transmitting a receivable radio wave, based on the satellite elevation angle information and the satellite azimuth angle information; makes a determination for locations of indoors when the 3D azimuth area is less than or equal to a 3D azimuth area threshold value which is preset; and makes an outdoor determination when the 3D azimuth area is not less than or equal to the 3D azimuth area threshold value.

The indoor/outdoor environment classification determination unit, according to the sixth aspect, calculates a degree of bias of a satellite transmitting a receivable radio wave, toward a predetermined elevation angle and a specific direction, based on the satellite elevation angle information and the satellite azimuth angle information; makes a determination for locations of indoors when the degree of bias is less than or equal to a degree of bias threshold value which is preset; and makes an outdoor determination when the degree of bias is not less than or equal to the degree of bias threshold value.

The indoor/outdoor environment classification determination unit, according to the sixth aspect, calculates a composite standard deviation of an elevation angle and an azimuth angle of a satellite transmitting a receivable radio wave, based on the satellite elevation angle information and the satellite azimuth angle information; sets a first standard deviation threshold value and a second standard deviation threshold value less than the first standard deviation threshold value, based on height above ground information directly or indirectly acquired from height above ground derivation means provided in the mobile terminal; makes an outdoor determination when the composite standard deviation is not less than or equal to the first composite standard deviation threshold value; assesses whether or not the composite standard deviation is less than or equal to a second composite standard deviation threshold value less than the first composite standard deviation threshold value, when the composite standard deviation is less than or equal to the first composite standard deviation threshold value; makes an indoor and not-near-a-window determination when the composite standard deviation is less than or equal to the second composite standard deviation threshold value; and makes an indoor and near-a-window determination when the composite standard deviation is not less than or equal to the second composite standard deviation threshold value.

The indoor/outdoor environment classification determination unit, according to the sixth aspect, calculates a composite standard deviation of an elevation angle and an azimuth angle of a satellite transmitting a receivable radio wave, based on the satellite elevation angle information and the satellite azimuth angle information; sets a first standard deviation threshold value and a second standard deviation threshold value less than the first standard deviation threshold value, based on height above ground information directly or indirectly acquired from height above ground derivation means provided in the mobile terminal; makes an outdoor determination when the composite standard deviation is not less than or equal to the first composite standard deviation threshold value; assesses whether or not the composite standard deviation is less than or equal to a second composite standard deviation threshold value less than the first composite standard deviation threshold value, when the composite standard deviation is less than or equal to the first composite standard deviation threshold value; assesses whether or not moving speed information directly or indirectly acquired from moving speed derivation means provided in the mobile terminal is greater than or equal to a first moving speed threshold value which is preset when the composite standard deviation is less than or equal to the second composite standard deviation threshold value; makes an inside-a-subway determination when the moving speed information is greater than or equal to the first moving speed threshold value; makes an indoor and not-near-a-window determination when the moving speed information is not greater than or equal to the first moving speed threshold value; assesses whether or not moving speed information directly or indirectly acquired from the moving speed derivation means is greater than or equal to a second moving speed threshold value which is preset when the composite standard deviation is less than or equal to the second composite standard deviation threshold value; makes an inside-a-ground-vehicle determination when the moving speed information is greater than or equal to the second moving speed threshold value; and makes an indoor and near-a-window determination when the moving speed information is not greater than or equal to the second moving speed threshold value.

Furthermore, the disclosure of the aforementioned PTLs is incorporated herein by reference thereto. The example embodiments and the examples may be changed and adjusted within the scope of the entire disclosure (including the claims and the drawings) of the present invention, and on the basis of the basic technological concept thereof. Further, within the scope of the entire disclosure of the present invention, various disclosed elements (including the respective elements of the claims, the respective elements of the example embodiments and the examples, and the respective elements of the drawings) may be combined and selected (or not selected as necessary) in a variety of ways. That is to say, it is apparent that the present invention includes various modifications and changes that may be made by a person skilled in the art, on the basis of the entire disclosure including the claims and the drawings, and the technological concept. Further, with regard to numerical values and numerical ranges described herein, any intermediate values, lower numerical values, and small ranges should be interpreted to be described even when there is no explicit description thereof.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1 Mobile terminal
2 GPS antenna
3 GPS receiver (satellite receiver)
4 Indoor/outdoor environment classification determination unit
5 Data transmission unit
6 Network
7 Data server
8 Indoor/outdoor environment classification visualization unit
9 Height above ground derivation unit
10 Moving speed derivation unit
11 Sensor
12 Information source
21 Indoor/outdoor environment classification determination unit
30 Satellite receiver
31 Indoor/outdoor environment classification determination unit
100 Indoor/outdoor determination system

The invention claimed is:

1. An indoor/outdoor determination method of determining whether a mobile terminal exists indoors or outdoors by use of a hardware resource, the method comprising:
   determining whether the mobile terminal exists indoors or outdoors, based on at least either of satellite elevation angle information and satellite azimuth angle information directly or indirectly acquired from a satellite receiver provided in the mobile terminal,
   counting a first satellite count existing in a first elevation angle range, based on the satellite elevation angle information;
   counting a second satellite count existing in a second elevation angle range higher than the first elevation angle range, based on the satellite elevation angle information;
   calculating a satellite count ratio between the first satellite count and the second satellite count;
   making a determination for locations of indoors when the satellite count ratio is greater than or equal to a first satellite count ratio threshold value which is preset; and
   making an outdoor determination when the satellite count ratio is not greater than or equal to the first satellite count ratio threshold value.

2. The indoor/outdoor determination method according to claim 1, further comprising:
   assessing whether or not the satellite count ratio is greater than or equal to a second satellite count ratio threshold value greater than the first satellite count ratio threshold value when the satellite count ratio is greater than or equal to the first satellite count ratio threshold value;
   making an indoor and not-near-a-window determination when the satellite count ratio is greater than or equal to the second satellite count ratio threshold value; and
   making an indoor and near-a-window determination when the satellite count ratio is not greater than or equal to the second satellite count ratio threshold value.

3. An indoor/outdoor determination method of determining whether a mobile terminal exists indoors or outdoors by use of a hardware resource, the method comprising:
   determining whether the mobile terminal exists indoors or outdoors, based on at least either of satellite elevation angle information and satellite azimuth angle information directly or indirectly acquired from a satellite receiver provided in the mobile terminal,
   calculating an average elevation angle, a maximum elevation angle, and an elevation angle standard deviation, based on the satellite elevation angle information;
   making an outdoor determination when the average elevation angle is not less than or equal to an average elevation angle threshold value which is preset;
   making an outdoor determination when the maximum elevation angle is not less than or equal to a first maximum elevation angle threshold value which is preset;
   making an outdoor determination when the elevation angle standard deviation is not less than or equal to an elevation angle standard deviation threshold value which is preset; and
   making a determination for locations of indoors when the average elevation angle is less than or equal to the average elevation angle threshold value, the maximum elevation angle is less than or equal to the maximum elevation angle threshold value, and the elevation angle standard deviation is less than or equal to the elevation angle standard deviation threshold value.

4. The indoor/outdoor determination method according to claim 3, further comprising:
   when the average elevation angle is less than or equal to the average elevation angle threshold value, the maximum elevation angle is less than or equal to the maximum elevation angle threshold value, and the elevation angle standard deviation is less than or equal to the first elevation angle standard deviation threshold value, assessing whether or not the elevation angle standard deviation is less than or equal to a second elevation angle standard deviation threshold value less than the first elevation angle standard deviation threshold value;
   making an indoor and not-near-a-window determination when the elevation angle standard deviation is less than or equal to the second elevation angle standard deviation threshold value; and
   making an indoor and near-a-window determination when the elevation angle standard deviation is not less than or equal to the second elevation angle standard deviation threshold value.

5. The indoor/outdoor determination method according to claim 4, further comprising:
   calculating an azimuth width of a satellite transmitting a receivable radio wave, based on the satellite azimuth angle information, when the elevation angle standard deviation is less than or equal to the second elevation angle standard deviation threshold value;
   making an indoor and not-near-a-window determination when the azimuth width is less than or equal to an azimuth width threshold value which is preset; and
   making an indoor and near-a-window determination when the azimuth width is not less than or equal to the azimuth width threshold value.

6. The indoor/outdoor determination method according to claim 4, further comprising:
   calculating an azimuth angle standard deviation of a satellite transmitting a receivable radio wave, based on the satellite azimuth angle information, when the elevation angle standard deviation is less than or equal to the second elevation angle standard deviation threshold value;
   making an indoor and not-near-a-window determination when the azimuth angle standard deviation is less than or equal to an azimuth angle standard deviation threshold value which is preset; and making an indoor and near-a-window determination when the azimuth angle standard deviation is not less than or equal to the azimuth angle standard deviation threshold value.

7. An indoor/outdoor determination method of determining whether a mobile terminal exists indoors or outdoors by use of a hardware resource, the method comprising:
determining whether the mobile terminal exists indoors or outdoors, based on at least either of satellite elevation angle information and satellite azimuth angle information directly or indirectly acquired from a satellite receiver provided in the mobile terminal,
calculating a composite standard deviation of an elevation angle and an azimuth angle of a satellite transmitting a receivable radio wave, based on the satellite elevation angle information and the satellite azimuth angle information;
making an outdoor determination when the composite standard deviation is not less than or equal to a first composite standard deviation threshold value which is preset;
assessing whether or not the composite standard deviation is less than or equal to a second composite standard deviation threshold value less than the first composite standard deviation threshold value when the composite standard deviation is less than or equal to the first composite standard deviation threshold value;
making an indoor and not-near-a-window determination when the composite standard deviation is less than or equal to the second composite standard deviation threshold value; and
making an indoor and near-a-window determination when the composite standard deviation is not less than or equal to the second composite standard deviation threshold value.

8. The indoor/outdoor determination method according to claim 7, further comprising:
setting the first composite standard deviation threshold value and a second composite standard deviation threshold value less than the first composite standard deviation threshold value, based on height above ground information directly or indirectly acquired from height above ground derivation unit provided in the mobile terminal;
making an outdoor determination when the composite standard deviation is not less than or equal to the first composite standard deviation threshold value;
assessing whether or not the composite standard deviation is less than or equal to the second composite standard deviation threshold value less than the first composite standard deviation threshold value when the composite standard deviation is less than or equal to the first composite standard deviation threshold value;
making an indoor and not-near-a-window determination when the composite standard deviation is less than or equal to the second composite standard deviation threshold value; and
making an indoor and near-a-window determination when the composite standard deviation is not less than or equal to the second composite standard deviation threshold value.

9. The indoor/outdoor determination method according to claim 7, further comprising:
setting the first composite standard deviation threshold value and a second composite standard deviation threshold value less than the first composite standard deviation threshold value, based on height above ground information directly or indirectly acquired from height above ground derivation unit provided in the mobile terminal;
assessing whether or not moving speed information directly or indirectly acquired from moving speed derivation unit provided in the mobile terminal is greater than or equal to a first moving speed threshold value which is preset when the composite standard deviation is less than or equal to the second composite standard deviation threshold value;
making an inside-a-subway determination when the moving speed information is greater than or equal to the first moving speed threshold value;
making an indoor and not-near-a-window determination when the moving speed information is not greater than or equal to the first moving speed threshold value;
assessing whether or not moving speed information directly or indirectly acquired from the moving speed derivation unit is greater than or equal to a second moving speed threshold value which is preset when the composite standard deviation is less than or equal to the second composite standard deviation threshold value;
making an inside-a-ground-vehicle determination when the moving speed information is greater than or equal to the second moving speed threshold value; and
making an indoor and near-a-window determination when the moving speed information is not greater than or equal to the second moving speed threshold value.

* * * * *